US009497798B2

(12) United States Patent
Kazmi et al.

(10) Patent No.: US 9,497,798 B2
(45) Date of Patent: Nov. 15, 2016

(54) RADIO NODE, A USER EQUIPMENT AND METHODS FOR MANAGING A TRANSMISSION

(71) Applicant: TELEFONAKTIEBOLAGET L M ERICSSON (PUBL), Stockholm (SE)

(72) Inventors: Muhammad Kazmi, Bromma (SE); Chester Park, Seoul (KR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 671 days.

(21) Appl. No.: 13/859,494

(22) Filed: Apr. 9, 2013

(65) Prior Publication Data

US 2014/0092877 A1  Apr. 3, 2014

Related U.S. Application Data

(60) Provisional application No. 61/708,252, filed on Oct. 1, 2012.

(51) Int. Cl.
| | |
|---|---|
| *H04W 88/06* | (2009.01) |
| *H04B 7/06* | (2006.01) |
| *H04B 7/04* | (2006.01) |
| *H04W 52/36* | (2009.01) |

(52) U.S. Cl.
CPC .......... *H04W 88/06* (2013.01); *H04B 7/0689* (2013.01); *H04B 7/0413* (2013.01); *H04W 52/365* (2013.01)

(58) Field of Classification Search
CPC H04B 7/0617; H04B 7/0626; H04B 7/0413; H04W 28/18; H04W 88/06; H04W 52/146
See application file for complete search history.

(56) References Cited

U.S. PATENT DOCUMENTS

| | | | |
|---|---|---|---|
| 6,594,303 B1* | 7/2003 | Agrawal | H04B 1/707 375/130 |
| 2006/0083195 A1 | 4/2006 | Forenza et al. | |
| 2010/0208602 A1 | 8/2010 | Stolt et al. | |
| 2011/0176593 A1* | 7/2011 | Hultell | H04B 7/0404 375/224 |
| 2012/0082192 A1* | 4/2012 | Pelletier | H04W 52/42 375/219 |
| 2012/0177011 A1* | 7/2012 | Xi | H04B 7/0404 370/335 |

FOREIGN PATENT DOCUMENTS

| | | |
|---|---|---|
| EP | 1 318 617 A1 | 6/2003 |
| WO | WO 2008/155370 A2 | 12/2008 |

OTHER PUBLICATIONS

3GPP TS 34.121-1 v9.5.0 (Jun. 2011), P.P. 1-1506.*
3GPP TSG RAN WG1 61 (R1-102828), "Specifying basic building blocks of UL multi-antenna transmission", Texas Instruments, May 10-14, 2010, Montreal, Canada, the whole document.

(Continued)

*Primary Examiner* — Jung Park

(57) ABSTRACT

A radio network node, a user equipment and methods therein for managing a transmission from the user equipment to the radio network node are disclosed. In one embodiment, the radio network node adapts a transport format relating to the transmission based on information indicating at least one mode switching point of a radio transmitter. The radio transmitter is comprised in the user equipment. In another embodiment, the user equipment adapts the transmission based on the information indicating at least one mode switching point of the radio transmitter comprised in the user equipment.

26 Claims, 10 Drawing Sheets

(56) References Cited

OTHER PUBLICATIONS

3GPP TS 36.211, "3GPP; Technical specification group radio access network; E-UTRA; Physical channels and modulation". 3GPP TS 36.211 V10.5.0 (Jun. 2012), 3rd Generation Partnership Project; Technical Specification Group Radio Access Network; Evolved Universal Terrestrial Radio Access (E-UTRA); Physical Channels and Modulation (Release 10), the whole document.

3GPP TS 36.213, V10.6.0 (Jun. 2012), $3^{rd}$ Generation Partnership Project; Technical Specification Group Radio Access Network; Evolved Universal Terrestrial Radio Access (E-UTRA); Physical layer procedures (Release 10), the whole document.

* cited by examiner

Fig. 9

| PMI | RI 0 | RI 1 |
|---|---|---|
| 0 | $\frac{1}{\sqrt{2}}\begin{bmatrix}1\\1\end{bmatrix}$ | $\frac{1}{\sqrt{2}}\begin{bmatrix}1&0\\0&1\end{bmatrix}$ |
| 1 | $\frac{1}{\sqrt{2}}\begin{bmatrix}1\\-1\end{bmatrix}$ | - |
| 2 | $\frac{1}{\sqrt{2}}\begin{bmatrix}1\\j\end{bmatrix}$ | - |
| 3 | $\frac{1}{\sqrt{2}}\begin{bmatrix}1\\-j\end{bmatrix}$ | - |
| 4 | $\frac{1}{\sqrt{2}}\begin{bmatrix}1\\0\end{bmatrix}$ | - |
| 5 | $\frac{1}{\sqrt{2}}\begin{bmatrix}0\\1\end{bmatrix}$ | - |

Fig. 10

| PMI | RI 0 | RI 1 | RI 2 | RI 3 |
|---|---|---|---|---|
| 0 | $\frac{1}{2}\begin{bmatrix}1\\1\\1\\-1\end{bmatrix}$ | $\frac{1}{2}\begin{bmatrix}1&0\\1&0\\0&1\\0&-j\end{bmatrix}$ | $\frac{1}{2}\begin{bmatrix}1&0&0\\1&0&0\\0&1&0\\0&0&1\end{bmatrix}$ | $\frac{1}{2}\begin{bmatrix}1&0&0&0\\0&1&0&0\\0&0&1&0\\0&0&0&1\end{bmatrix}$ |
| 1 | $\frac{1}{2}\begin{bmatrix}1\\1\\j\\j\end{bmatrix}$ | $\frac{1}{2}\begin{bmatrix}1&0\\1&0\\0&1\\0&j\end{bmatrix}$ | $\frac{1}{2}\begin{bmatrix}1&0&0\\-1&0&0\\0&1&0\\0&0&1\end{bmatrix}$ | - |
| 2 | $\frac{1}{2}\begin{bmatrix}1\\1\\-1\\1\end{bmatrix}$ | $\frac{1}{2}\begin{bmatrix}1&0\\-j&0\\0&1\\0&1\end{bmatrix}$ | $\frac{1}{2}\begin{bmatrix}1&0&0\\0&1&0\\1&0&0\\0&0&1\end{bmatrix}$ | - |
| 3 | $\frac{1}{2}\begin{bmatrix}1\\1\\-j\\-j\end{bmatrix}$ | $\frac{1}{2}\begin{bmatrix}1&0\\-j&0\\0&1\\0&-1\end{bmatrix}$ | $\frac{1}{2}\begin{bmatrix}1&0&0\\0&1&0\\-1&0&0\\0&0&1\end{bmatrix}$ | - |
| 4 | $\frac{1}{2}\begin{bmatrix}1\\j\\1\\j\end{bmatrix}$ | $\frac{1}{2}\begin{bmatrix}1&0\\-1&0\\0&1\\0&-j\end{bmatrix}$ | $\frac{1}{2}\begin{bmatrix}1&0&0\\0&1&0\\0&0&1\\1&0&0\end{bmatrix}$ | - |

| PMI | RI 0 | RI 1 | RI 2 | RI 3 |
|-----|------|------|------|------|
| 5 | $\frac{1}{2}\begin{bmatrix}1\\j\\j\\1\end{bmatrix}$ | $\frac{1}{2}\begin{bmatrix}1 & 0\\-1 & 0\\0 & 1\\0 & j\end{bmatrix}$ | $\frac{1}{2}\begin{bmatrix}1 & 0 & 0\\0 & 1 & 0\\0 & 0 & 1\\-1 & 0 & 0\end{bmatrix}$ | - |
| 6 | $\frac{1}{2}\begin{bmatrix}1\\j\\-1\\-j\end{bmatrix}$ | $\frac{1}{2}\begin{bmatrix}1 & 0\\j & 0\\0 & 1\\0 & j\end{bmatrix}$ | $\frac{1}{2}\begin{bmatrix}0 & 1 & 0\\1 & 0 & 0\\1 & 0 & 0\\0 & 0 & 1\end{bmatrix}$ | - |
| 7 | $\frac{1}{2}\begin{bmatrix}1\\j\\-j\\-1\end{bmatrix}$ | $\frac{1}{2}\begin{bmatrix}1 & 0\\j & 0\\0 & 1\\0 & -1\end{bmatrix}$ | $\frac{1}{2}\begin{bmatrix}0 & 1 & 0\\1 & 0 & 0\\-1 & 0 & 0\\0 & 0 & 1\end{bmatrix}$ | - |
| 8 | $\frac{1}{2}\begin{bmatrix}1\\-1\\1\\1\end{bmatrix}$ | $\frac{1}{2}\begin{bmatrix}1 & 0\\0 & 1\\1 & 0\\0 & 1\end{bmatrix}$ | $\frac{1}{2}\begin{bmatrix}0 & 1 & 0\\1 & 0 & 0\\0 & 0 & 1\\1 & 0 & 0\end{bmatrix}$ | - |
| 9 | $\frac{1}{2}\begin{bmatrix}1\\-1\\j\\-j\end{bmatrix}$ | $\frac{1}{2}\begin{bmatrix}1 & 0\\0 & 1\\1 & 0\\0 & -1\end{bmatrix}$ | $\frac{1}{2}\begin{bmatrix}0 & 1 & 0\\1 & 0 & 0\\0 & 0 & 1\\-1 & 0 & 0\end{bmatrix}$ | - |
| 10 | $\frac{1}{2}\begin{bmatrix}1\\-1\\-1\\-1\end{bmatrix}$ | $\frac{1}{2}\begin{bmatrix}1 & 0\\0 & 1\\-1 & 0\\0 & 1\end{bmatrix}$ | $\frac{1}{2}\begin{bmatrix}0 & 1 & 0\\0 & 0 & 1\\1 & 0 & 0\\1 & 0 & 0\end{bmatrix}$ | - |
| 11 | $\frac{1}{2}\begin{bmatrix}1\\-1\\-j\\j\end{bmatrix}$ | $\frac{1}{2}\begin{bmatrix}1 & 0\\0 & 1\\-1 & 0\\0 & -1\end{bmatrix}$ | $\frac{1}{2}\begin{bmatrix}0 & 1 & 0\\0 & 0 & 1\\1 & 0 & 0\\-1 & 0 & 0\end{bmatrix}$ | - |
| 12 | $\frac{1}{2}\begin{bmatrix}1\\-j\\1\\-j\end{bmatrix}$ | $\frac{1}{2}\begin{bmatrix}1 & 0\\0 & 1\\0 & 1\\1 & 0\end{bmatrix}$ | - | - |
| 13 | $\frac{1}{2}\begin{bmatrix}1\\-j\\j\\-1\end{bmatrix}$ | $\frac{1}{2}\begin{bmatrix}1 & 0\\0 & 1\\0 & -1\\1 & 0\end{bmatrix}$ | - | - |
| 14 | $\frac{1}{2}\begin{bmatrix}1\\-j\\-1\\j\end{bmatrix}$ | $\frac{1}{2}\begin{bmatrix}1 & 0\\0 & 1\\0 & 1\\-1 & 0\end{bmatrix}$ | - | - |

Fig. 10 cont.

| PMI | RI 0 | RI 1 | RI 2 | RI 3 |
|---|---|---|---|---|
| 15 | $\frac{1}{2}\begin{bmatrix} 1 \\ -j \\ -j \\ 1 \end{bmatrix}$ | $\frac{1}{2}\begin{bmatrix} 1 & 0 \\ 0 & 1 \\ 0 & -1 \\ -1 & 0 \end{bmatrix}$ | - | - |
| 16 | $\frac{1}{2}\begin{bmatrix} 1 \\ 0 \\ 1 \\ 0 \end{bmatrix}$ | - | - | - |
| 17 | $\frac{1}{2}\begin{bmatrix} 1 \\ 0 \\ -1 \\ 0 \end{bmatrix}$ | - | - | - |
| 18 | $\frac{1}{2}\begin{bmatrix} 1 \\ 0 \\ j \\ 0 \end{bmatrix}$ | - | - | - |
| 19 | $\frac{1}{2}\begin{bmatrix} 1 \\ 0 \\ -j \\ 0 \end{bmatrix}$ | - | - | - |
| 20 | $\frac{1}{2}\begin{bmatrix} 0 \\ 1 \\ 0 \\ 1 \end{bmatrix}$ | - | - | - |
| 21 | $\frac{1}{2}\begin{bmatrix} 0 \\ 1 \\ 0 \\ -1 \end{bmatrix}$ | - | - | - |
| 22 | $\frac{1}{2}\begin{bmatrix} 0 \\ 1 \\ 0 \\ j \end{bmatrix}$ | - | - | - |
| 23 | $\frac{1}{2}\begin{bmatrix} 0 \\ 1 \\ 0 \\ -j \end{bmatrix}$ | - | - | - |

Fig. 10 cont.

RADIO NODE, A USER EQUIPMENT AND METHODS FOR MANAGING A TRANSMISSION

CROSS-REFERENCE TO RELATED APPLICATION

This application claims the benefit of U.S. Provisional Patent Application 61/708,252 filed Oct. 1, 2012.

TECHNICAL FIELD

Embodiments herein generally relate to wireless communications receivers, and more particularly relate to transceiver performance. Specifically, some embodiments relate to a radio network node, a user equipment and methods therein for managing a transmission from the user equipment to the radio network node.

BACKGROUND

In the field of wireless communication receivers, different requirements relating to transceiver performance may be considered. One such requirement concerns so called phase discontinuity.

Phase discontinuity (PD) is a measure of change in phase between any two adjacent timeslots of an uplink transmission from a user equipment to a radio base station in a telecommunication system. Briefly, uplink (UL) relates typically relates to transmissions from the user equipment to the radio base station, while downlink (DL) typically relates to transmissions from the radio base station to the user equipment. The PD requirements for UL transmitted signals/channels are defined in High Speed Packet Access (HSPA) for single uplink (UL) antenna e.g. for UL Dedicated Physical Channel (DPCH), High Speed Dedicated Physical Control Channel (HS-DPCCH) and Enhanced Dedicated Channel (E-DCH).

For example, for the UL DPCH the rate of occurrence of any phase discontinuity on an uplink DPCH for the parameters specified in table 1 shall not exceed the values specified in table 2.

TABLE 1

Parameters for Phase discontinuity

| Parameter | Unit | Level |
| --- | --- | --- |
| Power control step size | dB | 1 |

TABLE 2

Phase discontinuity minimum requirement

| Phase discontinuity $\Delta\theta$ in degrees | Maximum allowed rate of occurrence in Hz |
| --- | --- |
| $\Delta\theta \leq 30$ | 1500 |
| $30 < \Delta\theta \leq 60$ | 300 |

Consider a known user equipment comprising a transmitter. For the purpose of explaining phase discontinuity, the transmitter includes two power amplifiers. Each of the two power amplifiers is operated when the transmission, to be transmitted, is at a transmit power in a respective transmit power range. When the user equipment switches from operating one power amplifier to operating the other power amplifier, the phase discontinuity occurs. In this context, the point in terms of e.g. power level at which the user equipment switches power amplifier may be referred to as a Power Amplifier (PA) switching point. In many scenarios, performance may be degraded and/or loss may increase when the user equipment switches between the two power amplifiers as described above.

Furthermore, in for example scenarios involving a multi antenna system such as Multiple-Input-Multiple-Output (MIMO), requirements relating to relative phase discontinuity may be applicable.

Consider another known user equipment capable of MIMO transmission. The user equipment comprises a transmitter as shown in FIG. 1. For the purpose of explaining relative phase discontinuity, the transmitter comprises two transmitter branches TX branch #1, TX branch #2.

Two absolute phases for transmitter branch #1 and #2, respectively, are denoted $\phi_1(t)$ and $\phi_2(t)$. A Relative Phase (RP) is defined as $\delta\phi(t)=\phi_1(t)-\phi_2(t)$. Then, the Relative Phase Discontinuity (RPD) is defined as a difference of RP between two time instants $t_1$ and $t_2$, i.e., $\delta\phi(t_1)-\delta\phi(t_2)$. Thus, the relative phase discontinuity is a measure of change of relative phase between different transmitter branches for any two adjacent timeslots. Similarly to the phase discontinuity, the relative phase discontinuity may degrade performance and/or increase loss in many scenarios.

SUMMARY

An object is to improve performance of a transmission from a user equipment to a radio base station.

According to an aspect the object is achieved by a method, performed by a radio network node, for managing a transmission from a user equipment to the radio network node. The radio network node adapts a transport format relating to the transmission based on information indicating at least one mode switching point of a radio transmitter. The radio transmitter is comprised in the user equipment.

According to another aspect the object is achieved by a radio network node configured to manage a transmission from a user equipment to the radio network node. The radio network node comprises a processing circuit configured to adapt a transport format relating to the transmission based on information indicating at least one mode switching point of a radio transmitter. The radio transmitter is comprised in the user equipment.

According to a further aspect the object is achieved by a method, performed by a user equipment, for managing a transmission from the user equipment to a radio network node. The user equipment adapts the transmission based on information. The information indicates at least one mode switching point of a radio transmitter comprised in the user equipment.

According to still another aspect the object is achieved by a user equipment configured to manage a transmission from the user equipment to a radio network node. The user equipment comprises a processing circuit configured to adapt the transmission based on information. The information indicates at least one mode switching point of a radio transmitter comprised in the user equipment.

Thanks to that the radio network node adapts the transport format for the transmission based on the information indicating the at least one mode switching point, the radio network node may select a more robust, or conservative, transport format. A more robust transport format will make it easier to decode, by the radio network node, the transmission than if a less robust transport format that would have been selected for the transmission as would be the case when the information indicating the at least one mode switching point is not accounted for. Thus, errors in decoding may decrease despite the existence of phase discontinuities. As a result, performance may increase. Thereby, an expected negative impact, due to the phase discontinuities, on the performance is reduced. To conclude, a reduction of phase discontinuities and/or relative phase discontinuities, or the impact thereof, in the transmission from the user equipment to the radio base station is achieved.

Another object may be how to make a radio network node aware of the information indicating at least one mode switching point of a radio transmitter, which is comprised in a user equipment.

According to a further aspect, this object is achieved by a method performed by a radio network node for obtaining the information indicating the at least one mode switching point. The radio network node scans at least a portion of a transmit power range of a user equipment by increasing power of a reference signal and measuring the relative phase of the received reference signal. When the radio network node detects a discontinuity in the measured relative phase, the radio network node registers the information indicating the at least one mode switching point as the transmit power at the detected discontinuity.

Those skilled in the art will recognize additional features and advantages upon reading the following detailed description, and upon viewing the accompanying drawings.

BRIEF DESCRIPTION OF THE DRAWINGS

FIG. 9 is a codebook for LTE UL.

FIG. 10 is a codebook for LTE UL.

DETAILED DESCRIPTION

Different aspects are described more fully hereinafter with reference to the accompanying drawings, in which examples of embodiments are shown. Embodiments disclosed herein may be implemented in many different forms and should not be construed as limited to the embodiments set forth below. It should also be noted that these embodiments are not mutually exclusive. Thus, components or features from one embodiment may be assumed to be present or used in another embodiment, where such inclusion is suitable.

A definition of the information about the at least one mode switching point, or mode switching information, is presented here. Throughout this disclosure, the mode switching information is defined as the information about operation points at which the corresponding relative phase discontinuity or phase discontinuity changes abruptly. It may be related to the mode switching of radio transmitter components e.g. power amplifier (PA) or Radio Frequency Application Specific Integrated Circuit (RF ASIC). For example, the mode switching or aka the operation points depends upon the implementation of the radio components, e.g. PA. For example, a user equipment may include a multi-stage PA, which comprises two or more PAs. Typically, only one of the PA is active at a time depending upon the user equipment transmit power level. This saves battery power of the user equipment and thus enhances battery life. For example, a 3-stage PA has three PAs and 2 mode switching points. The mode switching information may therefore also include the number of PAs in a multi-stage PA. The mode switching information may include the transmit power levels of the operation points, or the transmit power difference between the consecutive operation points. It may also include the phase value of the operation points, or the phase differences between the consecutive operation points. It may further include the mode switching related parameters such as the hysteresis value. It may also comprise of the number of mode switching points over the total transmit power range of the user equipment, i.e. between the user equipment's maximum (23 dBm) and minimum (−50 dBm) output power levels. The mode switching information may also be defined over the user equipment transmit power range over which the user equipment radio transmitter requirements or certain types of radio transmitter requirements, e.g. transmit modulation quality defined between 23 dBm to −40 dBm. Due to the abrupt change in the phase of the signal at a mode switching point the accuracy with which the user equipment transmits power at the mode switching point generally becomes much worse.

Figure 2:
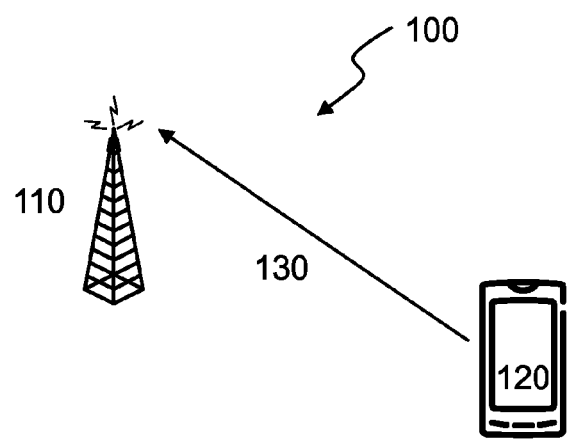
FIG. 2 is an exemplifying radio communication system in which embodiments herein may be implemented.

FIG. 2 depicts an exemplifying radio communications system 100 in which embodiments herein may be implemented. In this example, the radio communications system 100 is a LTE system. In other examples, the radio communication system may be any 3GPP cellular communication system, such as a Wideband Code Division Multiple Access (WCDMA) network, a Global System for Mobile communication (GSM network) or the like.

The radio communication system 100 comprises a radio network node 110. As used herein, the term "radio network node" may refer to an evolved Node B (eNB), a control node controlling one or more Remote Radio Units (RRUs), a radio base station, a base station, an access point or the like.

Furthermore, the radio communication system 100 comprises a user equipment 120. The user equipment 120 may send a transmission 130 to the radio network node 110. As used herein, the term "user equipment" may refer to a mobile phone, a cellular phone, a Personal Digital Assistant (PDA) equipped with radio communication capabilities, a smartphone, a laptop or Personal Computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic switch, a microphone, a loudspeaker, a camera sensor etc.

Figure 14:
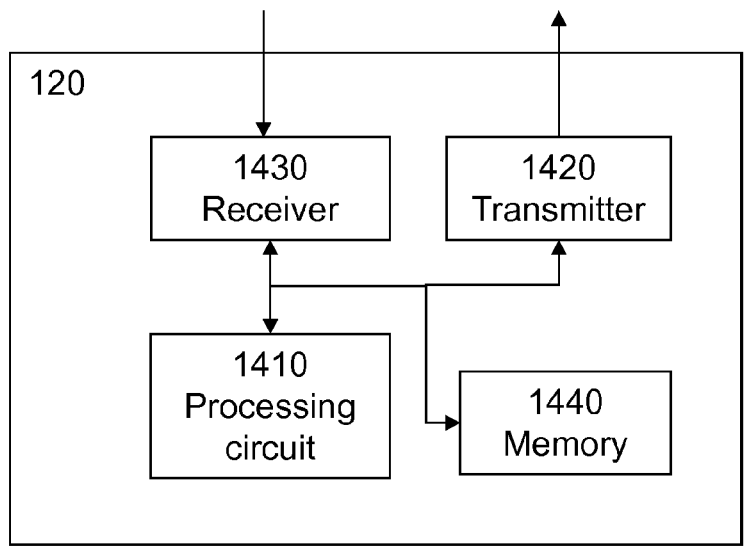
FIG. 14 is a block diagram illustrating an exemplifying user equipment according to embodiments herein.

The user equipment 120 may comprise a radio transmitter, denoted 1420 in FIG. 14 (not shown in FIG. 2). The radio transmitter may comprise a first power amplifier and a second power amplifier. At least one mode switching point may indicate when, in terms of transmit power of the radio transmitter, the radio transmitter may switch from a first mode, in which the first power amplifier is operated, to a second mode, in which the second power amplifier is operated. In this context, the term "operated" may mean the power amplifier at hand is active, or used, for transmitting a transmission to be sent from the user equipment 120 to the radio network node 110. A purpose of using different power amplifiers for transmission at different transmit powers is to, for instance, improve linearity over the range of the power amplifier and to decrease power consumption. Hence, information indicating the at least one mode switching point of the radio transmitter may be useful both the radio network node 110 and the user equipment 120.

Figure 3:
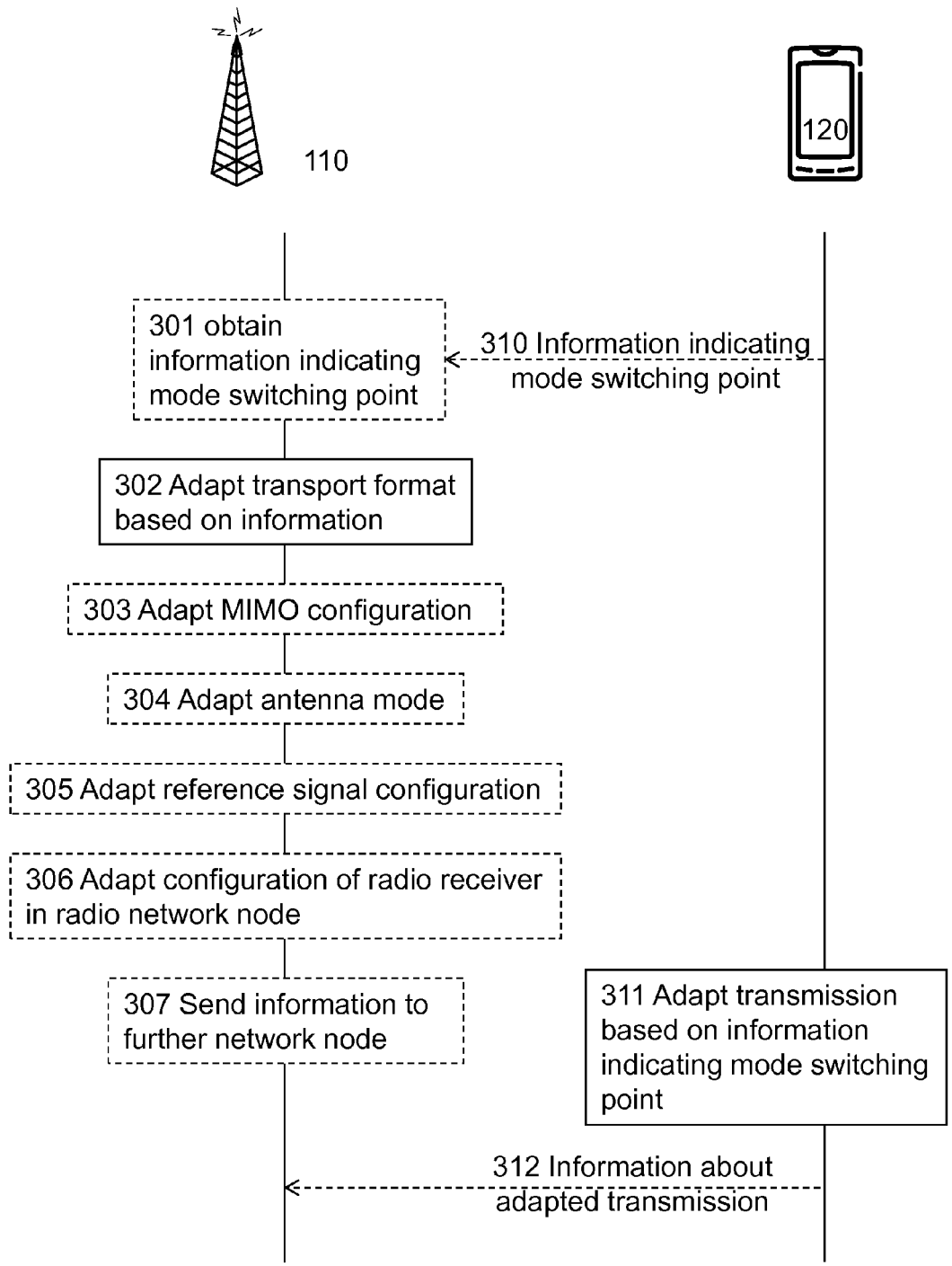
FIG. 3 is a combined signaling and flowchart illustrating an exemplifying method according to embodiments herein when implemented in the radio communication system of FIG. 2.

FIG. 3 illustrates an exemplifying method according to embodiments herein when implemented in the radio communication system 100 of FIG. 2. The illustrated method relates to management of the transmission 130 from the user equipment 120 to the radio network node 110. Thus, the transmission may be an uplink (UL) transmission.

The following actions may be performed in any suitable order.

Action 301

In order for the radio network node 110 to use the information indicating at least one mode switching point in action 302, the radio network node 110 may obtain the information indicating at least one mode switching point in different manners as explained in the following.

The obtained information may be determined by an indication received from the user equipment 120. See action 310 below.

The obtained information may be pre-defined. As an example, the pre-defined information about different types, e.g. model and/or manufacturer, of the user equipment 120 may be stored in radio network node 110.

The obtained information may be determined by measurements performed by the radio network node 110. See section "Obtaining information based on measurements".

The obtained information may be determined by a procedure for scanning, by the radio network node 110, transmit power range of the user equipment 120. See section "Obtaining information based on scanning UL transmit power range".

Advantageously, according to the three manners directly above, the radio network node may reduce Relative Phase Discontinuity (RPD) without knowledge about the indication that may be received from the user equipment.

Furthermore, according to some embodiments, the obtained information may relate to a first radio access technology, such as LTE or the like. The user equipment 120 is capable of at least the first radio access technology and a second radio access technology, such as High Speed Packet Access (HSPA). The method further comprises obtaining second information relating to the second radio access technology based on the information indicating at least one mode switching point for the first radio access technology provided that radio transmission characteristics for the first radio access technology is similar to radio transmission characteristics for the second radio access technology. The second information indicates at least one mode switching point of the radio transmitter 1420. See also section "Obtaining information based on common radio in multi-RAT UE".

According to further embodiments, the radio network node 110 may combine any of the manners of how to obtain the obtained information disclosed above. A combination of two or more manners may be used to determine the obtained information more accurately.

As an example, the radio network node 110 may first determine the information indicating at least one mode switching point, or "UE mode switching information", using the pre-defined information. Then, the radio network node 10 may further verify the UE mode switching information by using the method based on the measurements. If the results of the two methods match then the radio network node 110 may not perform any other method. However, if the results of the two methods don't match or only partially match then the radio network node 110 may perform yet another method e.g. based on scanning and so on.

Action 302

Once the radio network node 110 has obtained the information relating to at least one mode switching point, the radio network node 110 adapts a Transport Format (TF) relating to the transmission based on the information indicating at least one mode switching point.

The radio network node 110 serving the user equipment 120 typically selects the TF of the transmission based on information such as signal quality, user bit rate requirements, service type etc. However, according to this embodiment the radio network node 110 also takes into account the information indicating the at least one mode switching point when adapting the TF of the transmission.

The adaptation of UL transmission which is performed by the radio network node 110 serving the user equipment 120, may comprise the adaptation of the TF of the UL transmission which takes place on a suitable physical channel. For example in LTE, an eNB, as an example of the radio network node, can adapt the TF of the Physical Uplink Shared Channel (PUSCH) which carries data and/or data and control. For example, if the radio network node 110 determines that the user equipment 120 is causing significant RPD, i.e. higher than a threshold, the radio network node 110, which in this example is an eNB, can select more conservative transport format than the TF recommended based on UL signal quality estimate. In this way the UL signal can be more easily decoded by the serving node. For example, the radio network node 110 can determine the loss due to higher RPD by observing the UL receiver performance. In this way, it is possible to cope with potential loss of MIMO precoding gain due to higher RPD.

In actions 303, 304, 305 and 306, the radio network node 110 uses the information indicating at least one mode switching point as basis when adapting different parameters relating to the transmission as explained in the following.

Action 303

The radio network node 110 may adapt a MIMO configuration of the user equipment 120 based on the information, wherein the MIMO configuration relates to the transmission.

As an example, the radio network node 110 serving the user equipment 120 typically selects the MIMO configuration of the UL transmission based on information such as signal quality, user bit rate requirements, service type etc.

However, according to this embodiment, the serving radio network node 110 also takes into account the information indicating the at least one mode switching point when adapting the MIMO configuration of the UL transmission.

For example, if the radio network node 110 determines that the user equipment 120 is causing significant RPD, i.e. higher than a threshold, the radio network node 110 can select more conservative MIMO configuration, e.g., the number of spatial streams than the configuration recommended based on UL signal quality estimate. In this way the UL signal can be more easily recovered by the serving node, i.e. the radio network node 110. For example, the radio network node 110 can determine the loss due to higher RPD by observing the UL receiver performance. In this way, it is possible to cope with potential loss of MIMO precoding gain due to higher RPD. In yet another example, the radio network node 110 may configure the user equipment 120 to a lower order multiple antenna transmission, e.g. from 4×2 antenna scheme to 2×2 antenna scheme, and release the relevant resource, i.e. higher order multi antenna mode, to other UEs with smaller RPD. In yet another example, the radio network node 110 may configure the UE with higher RPD from beamforming, e.g. 2×2 antenna scheme, to a switched antenna diversity. The latter does not cause RPD.

Action 304

The radio network node 110 may adapt an antenna mode of the user equipment 120 based on the information, which antenna mode relates to the transmission;

The radio network node serving the user equipment 120 typically selects the UL antenna transmission mode for the UL transmission based on information such as UL signal quality, e.g. SINR, BLER etc, user bit rate requirements, service type etc. However, according to this embodiment, the radio network node 110 also takes into account the information indicating the at least one mode switching point when adapting the antenna transmission mode for the UL transmission.

For example, the radio network node 110 may adapt between the single antenna transmission and multiple antenna transmission modes depending upon the mode switching information. For example, if the radio network node 110 determines that the user equipment is causing significant RPD, i.e. higher than a threshold, then the radio network node 110 cannot exploit full MIMO gain. In this case the radio network node 110 may configure the user equipment 120 with higher RPD to single antenna transmission and release the relevant resource, i.e. multi antenna mode, to other UEs with smaller RPD.

Action 305

The radio network node 110 may adapt a reference signal configuration relating to the transmission based on the information.

In yet another example the serving node such as the radio network node 110 may adapt one or more parameters related to a UL reference signal transmitted by the user equipment 120 in order to minimize the loss of UL signals due to RPD. Examples of UL reference signals are SRS in LTE, DMRS in LTE and sounding signals (aka sounding dedicated physical control channel (S-DPCCH)) in HSPA.

For example in LTE when the radio network node is represented by an eNB, the eNB may adapt the SRS configuration parameters, i.e. those parameters not related to the power control, such as the SRS periodicity. For example, if a certain user equipment such as e.g. the user equipment 120 experiences large RPD, the SRS-based precoding is not very useful i.e. it is not very accurate to select precoding parameter(s) based on UL received signal quality on SRS. Therefore, from system capacity point of view, it may be beneficial for the serving radio network node, such as the radio network node 110, to allocate more SRS resource to user equipments with smaller RPD such as e.g. the user equipment 120. Therefore, the eNB can increase the SRS periodicity of the UEs with large RPD such that the user equipments with small RPD can be configured with smaller SRS periodicity. In this way the SRS resources can be utilized more efficiently and may also lower the UL interference in the cell.

Action 306

Figure 12:
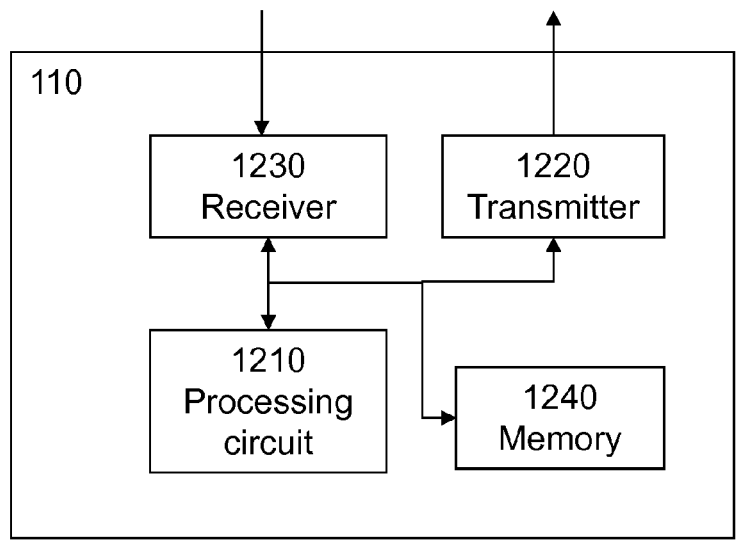
FIG. 12 is a block diagram illustrating an exemplifying radio network node according to embodiments herein.

The radio network node 110 may adapt a configuration of a radio receiver 1230 comprised in the radio network node 110 based on the information indicating the at least one mode switching point. The radio receiver 1230 is illustrated in FIG. 12.

In yet another embodiment the radio network node 110 serving the user equipment 120 may also adjust its receiver configuration, e.g. parameters related to its receiver, for decoding the signals on UL transmission depending upon the UE mode switching information. For example if the user equipment's RPD or PD on any UL transmission is above a threshold then the radio network node 110 uses more robust receiver for decoding the signals transmitted by this user equipment 120. A more robust receiver is capable of decoding signals received with lower signal quality. For example the radio network node 110 may use more receive antennas for receiving the UL signals transmitted by the user equipment 120 whose mode switching information depicts that its RPD or PD is higher than a threshold.

Action 307

Figure 4:
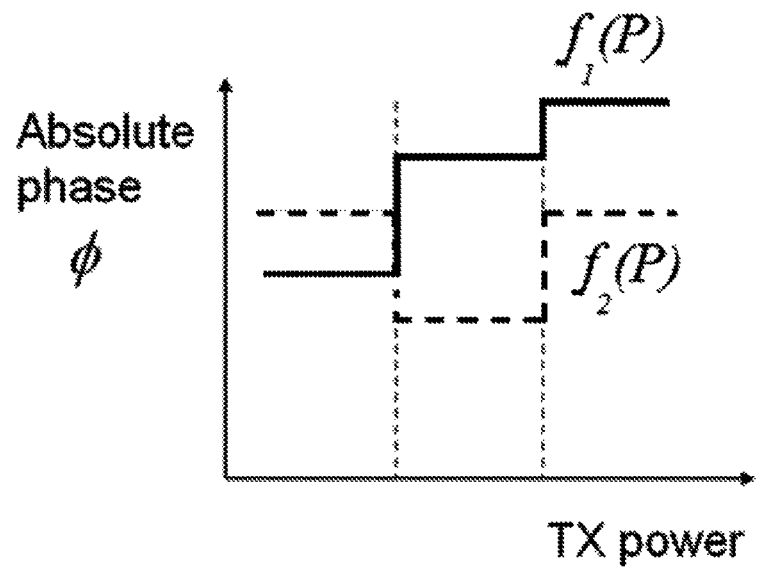
FIG. 4 is an example for the relationship between transmit power and absolute phase for a UE.

The radio network node 110 may send the information to a further network node, which uses the information for transmission between the user equipment 120 and the further network node not shown in FIG. 4.

Examples of the further network nodes are neighboring radio nodes, such as eNode B in LTE, Node B and Radio Network Controller (RNC) in HSPA etc), core network node, such as Mobility Management Entity (MME) in LTE) Minimization of drive test (MDT) node, Operation and Maintenance (O&M), Operational Support Systems (OSS), Self Organizing Network (SON) node, positioning node, e.g. E-SMLC in LTE etc. For example eNode B may signal the information to another eNode B over X2 interface and to a positioning node using LPPa.

The radio network node 110 may signal this information proactively or in response to explicit request received from another network node. The radio network node 110 may also signal this information to other nodes under specific scenario or condition e.g. at the time of cell change of the user equipment 120.

The further network node receiving the above indicated information may use it for radio operation tasks and/or network management tasks. Specific examples of such tasks are using the information after cell change, e.g. Hand Over (HO), Primary Cell change etc, adjusting or configuration of network planning parameters, e.g. selection of antenna modes, receiver type in the network node etc.

For example, after a cell change the new serving node does not have to again obtain the information relate to UE mode switching, adaptation of the UL transmission scheme etc.

Similarly the tuning of parameters which take into account the UE mode switching statistics will improve overall network performance since more resources can be assigned to UEs which has lower RPD or PD.

A positioning node may use the received information to select an appropriate positioning measurement for determining a location of the user equipment 120. For example if the UE mode switching leads to higher loss or degraded performance then it may select a positioning measurement which does not require the measuring node to perform positioning measurement on signals transmitted by the user equipment 120. For example positioning node may select a DL positioning measurement, e.g. Observed Time Difference of Arrival (OTDOA) Reference Signal Time Difference (RSTD), performed by the user equipment 120. This is because the higher RPD or PD on UL transmission may degrade the accuracy of the UL positioning measurements like UE Rx-Tx time difference, TA, base station (BS) Rx-Tx time difference etc. Similarly the positioning node may adapt or select a positioning measurement/positioning method based on UE mode switching characteristics.

If the network node signals or forwards the information of performance, model, power class, supported bands, supported RATs etc. to other network nodes, it is possible to collect the mode switching information from the user equipments of the same type from other network nodes. This may help to improve the accuracy of the mode switching information.

See also section "Method in a network node of forwarding the obtaining UE mode switching information and/or UL adaptation to other nodes".

Action 310

The user equipment 120 may send the information indicating at least one mode switching point to the radio network node 110. In this manner, the radio network node 110 may obtain, i.e. receive, the information indicating the at least one mode switching point and use the information as explained in conjunction with e.g. action 302.

Action 311

According to some embodiments, the user equipment 120 may autonomously adapt the transmission based on the information indicating the at least one mode switching point.

According to this embodiment the user equipment 120 determines information indicating the at least one mode switching point, or the mode switching information related to its multi-stage radio implementation for the UL transmission, and autonomously adapts its UL transmission in order to avoid the UL transmitted signal causing higher RPD. This in turn will enable the serving radio network node 120 to more easily receive and decode the UL signal transmitted by the user equipment. For example, the user equipment can apply any one or more of the UL adaptations disclosed above according to one or more pre-defined rules.

For example it may be pre-defined that the user equipment 120 is allowed to adapt certain PC parameters, e.g. within certain range, when certain condition related to mode switching is met e.g. when RPD or RP on any channel is above a threshold e.g. more than 40 degrees.

In another example it may be pre-defined that the user equipment 120 is allowed to adapt between certain antenna transmission modes, e.g. between single and multiple antenna modes, when condition related to mode switching is met e.g. when RPD or RP on any channel is above a threshold e.g. more than 45 degrees.

In yet another example, it may be pre-defined that the user equipment 120 is allowed to adapt between certain transport format of certain physical channel, e.g. for Physical Uplink Shared Channel (PUSCH) in LTE and E-DCH Dedicated Physical Data Channel (E-DPDCH) in HSPA, when condition related to mode switching is met e.g. when RPD or PD on any channel is above a threshold e.g. more than 50 degrees. The E-DPDCH is used when Enhanced Dedicated Channel (E-DCH) is configured.

The threshold can typically be pre-defined. However the network node may also configure the threshold at the user equipment 120.

The radio network node 110 may also explicitly configure the user equipment 120 whether the user equipment 120 is allowed to autonomously adapt the UL transmission or not. As an example, the radio network node 110 may explicitly configure the user equipment 120 according to one or more pre-defined rules.

More generally, this means that the adapting of the transmission may be performed by adapting a value relating to the transmission based on the information indicating at least one mode switching point. The value may comprise one or more of, as mentioned above:

one or more power control parameters relating to the transmission;

a transport format relating to the transmission;

a MIMO configuration of the user equipment 120, wherein the MIMO configuration relates to the transmission;

an antenna mode of the user equipment 120, which antenna mode relates to the transmission;

a reference signal configuration relating to the transmission; and a configuration of a radio receiver 1230 comprised in the radio network node 110.

The adapting of the transmission may be performed when the information indicates that a relative phase discontinuity of transmission exceeds a threshold value.

Action 312

The user equipment 120 may send information relating to the adapted transmission to the radio network node 110. In this manner, the radio network node 110 may be informed about how the user equipment 120 has autonomously adapted the transmission. Hence, the radio network node 110 may use the information relating to the adapted transmission when decoding the transmission from the user equipment 120.

The user equipment 120 may also explicitly inform the radio network node 110, e.g. eNB in LTE and Node B and/or RNC in HSPA, that it has adapted an UL transmission due to mode switching. The user equipment 120 may also inform the network node regarding the details of the performed action(s) related to the adaptation of the UL transmission e.g. adaption of UL PC parameters, UL antenna modes etc. The user equipment 120 may also inform the network node of the reason of the adaption of the UL transmission e.g. due to RPD and/or PD is above a threshold. The user equipment 120 may report the above information for certain type of adaptation. The user equipment 120 may also log the above information and report the statistics to the network after certain time period e.g. to MDT node which may use it for network planning related tasks. The user equipment 120 may report this information proactively or in response to explicit request received from a network node.

The network node uses the received information from the user equipment 120 to determine the statistics of the adaption of the UL transmissions by the user equipment 120 and also by several user equipments. The network node then adapts parameters related to the UL transmission in order to minimize unnecessary adaptation at the user equipment 120. The network node may also adapt a receiver type which is capable of handling signals, transmitted by the user equipment 120, which signals experience a higher RPD or PD.

For purposes of illustration and explanation only, these and other embodiments are described herein in the context of operating in a Radio Access Network (RAN) that communicates over radio communication channels with wireless terminals, also referred to as user equipment, or "UEs". More particularly, specific embodiments are described in the context of systems using LTE technology and/or High- Speed Downlink Packet Access (HSDPA) technology, as standardized by the membership of the 3$^{rd}$ Generation Partnership Project (3GPP). It will be understood, however, that the embodiments herein may be embodied generally in various types of communication networks. As used herein, the terms mobile terminal, wireless terminal, user equipment or UE, can refer to any device that receives data from a communication network, and may include, but are not limited to, a mobile telephone ("cellular" telephone), laptop/portable computer, pocket computer, hand-held computer, and/or desktop computer, device-to-device communication capable devices.

Also note that the use of terminology such as "radio network node" or "base station", which may be referred to in various contexts as NodeB or eNodeB or eNB, for example, and "wireless terminal," "mobile terminal," or "wireless device", often referred to as "UE" or "eUE" or "User Equipment", should be considering non-limiting and does not necessarily imply a certain hierarchical relation between two particular nodes of a communication link. In general, a base station, e.g., a "NodeB", and a wireless terminal, e.g., a "UE", may be considered as examples of respective different communications devices that communicate with each other over a wireless radio channel. While embodiments discussed herein may focus on wireless transmissions in a uplink from a UE to a NodeB, the inventive techniques may also be applied, for example, to downlink transmissions in some contexts. As a result, several embodiments described in detail below, including modified versions of the receiver circuit pictured in FIG. 3, may be suitable for use in various wireless terminals, base stations, or both. It will be appreciated, of course, that the details of accompanying circuitry, including antennas, antenna interface circuits, radio-frequency circuits, and other control and base band circuits, will vary, depending on the specific application of the inventive techniques disclosed herein. Because these details are not necessary to a complete understanding of the embodiments herein, those details are generally omitted in the following discussion and in the accompanying figures.

Mathematically, letting the $N_R \times N_T$ physical channel matrix, the $N_T \times R$ precoding matrix, and the $N_R \times R$ equivalent channel be denoted by H, W and E, respectively, it follows that $$E = HDW, \quad (1)$$

where D is the $N_T \times N_T$ diagonal matrix whose diagonal elements represent an absolute phase shift introduced by the transmitter branches. In detail, the i-th diagonal element is given as $d_i = \exp(j\phi_i)$. If the equivalent channel E is obtained through SRS, W is simply given as the identity matrix, since SRS is not precoded, and E is referred to as an unprecoded equivalent channel, as opposed to the precoded equivalent channel for DMRS.

Figure 1:
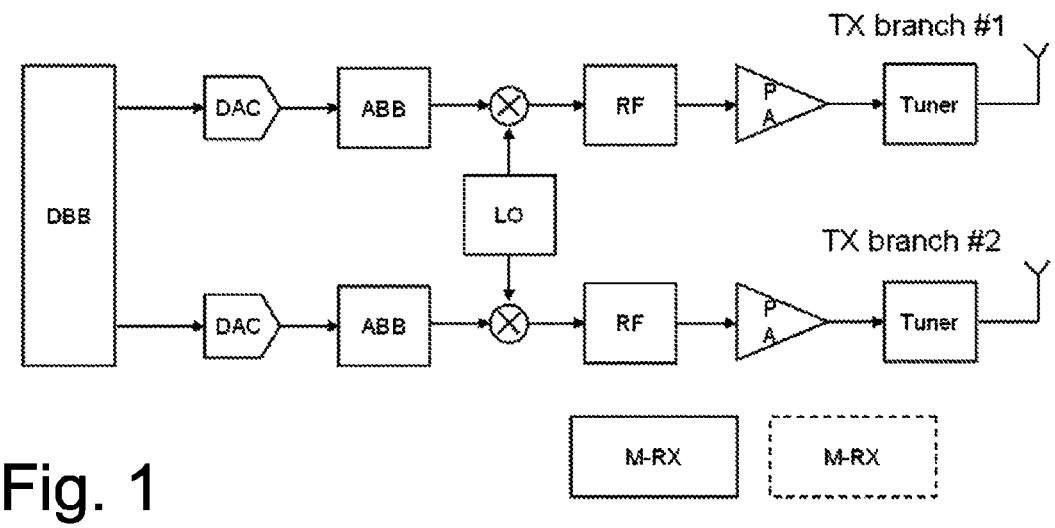
FIG. 1 is a two antenna UE transmitter architecture.

Let's take a closer look at the phase shift. Returning to FIG. 1, assume a UE with two transmit antennas such as e.g. the user equipment 120, for simplicity, although the following argument is equally applicable to the user equipment 120 when it comprises more than two transmit antennas.

Denoting the absolute phases of transmitter branch #1 and #2 by $\phi_1(t)$ and $\phi_2(t)$ respectively, the RP is defined as $\delta\phi(t) = \phi_1(t) - \phi_2(t)$. Then the RPD is defined as the difference of RP between two time instants $t_1$ and $t_2$, i.e., $\delta\phi(t_1) - \delta\phi(t_2)$.

The RPD of a transmitter branch typically comprises a power-dependent term and a time-dependent term. The power-dependent term depends on the transmit power, whereas the time-dependent term varies with time. From the viewpoint of modelling, the power-dependent term can be given as a function of the current transmit power, whereas the time-dependent term can be given as an additive random process.

The power-dependent RPD mainly comes from the power/configuration mode switching by which each transmitter branch switches the gain/bias state. The potential sources of the power-dependent RPD can be summarized as follows.

Power mode switching: Many state-of-the-art PAs switch the power mode according to the transmit power, in order to improve the power efficiency. Without extra design effort or additional circuitry, the two transmitter branches tend to respond to the power mode switching differently, thereby resulting in RPD across the switching points.

Configuration mode switching: Depending on the transmit power, the RF/ABB switches the configuration modes characterized by gain switching, adaptive biasing, signal path switching etc. in order to reduce the power consumption. Without extra design effort or additional circuitry, it is likely that the two transmitter branches experience different phase variation across the switching points. Therefore, the transmitter tends to experience non-negligible RPD in case of configuration mode switching.

AM-to-PM distortion: Since PAs are typically operated around the compression point to maximize the power efficiency, they may experience non-negligible AM-to-PM distortion without additional circuitry, e.g., digital pre-distortion. It is likely that the two PA devices have slightly different compression points, operate at slightly different power and operate under different loading conditions. This causes different distortion in the transmitter branches and consequently the transmitter tends to experience non-negligible RPD When it comes to precoder selection, the RPD between the measurement and the relevant precoding is of interest. Recalling that SRS is a natural choice for precoder selection, it can be seen as the RPD between the SRS transmission used for precoder selection and the subsequent PUSCH transmission applying the precoder. The RPD may lead to non-optimal precoder selection, even when the wireless channel is perfectly known to the eNB. This may result in non-trivial performance loss, since the precoder selection typically relies on the phase information of the transmitter branches.

It follows that the time frame of interest is about a few, or a few tens of, subframes. It depends on the processing time, due to for example measurement and precoder selection, and the SRS periodicity. For example, if the processing time is 8 msec and the period of SRS transmission is 10 msec, a minimum of 8 msec and a maximum of 17 msec should be assumed as the time frame. Given such a time frame, the power-dependent term has a larger impact on RPD than the time-dependent term and thus focus is on the power-dependent term, i.e., how to cope with it, in this disclosure.

Denoting the current transmit power by P(t), the absolute phase shift caused by the TX front end is given as $$\phi_1(t) = f_1(P(t))$$

$$\phi_2(t) = f_2(P(t)), \quad (2)$$

where $f_1(x)$ and $f_2(x)$ represent the power dependence of absolute phase for the two transmitter branches. This is exemplified in FIG. 4. Defining the power dependence of RP as $f_{1,2}(x) = f_1(x) - f_2(x)$, the corresponding RP is given as $$\delta\phi(t)=f_{1,2}(P(t)). \quad (3)$$

Figure 5:
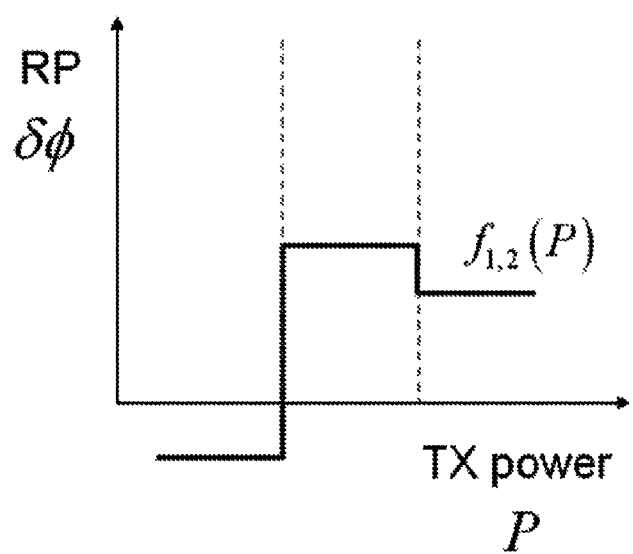
FIG. 5 is a relationship between a Relative Phase (RP) and a transmit power.

This is shown in FIG. 5. In other words, the RP is given a function of the current transmit power. Similarly, the RPD between $t_1$ and $t_2$ is given as $$\delta\phi(t_1)-\delta\phi(t_2)=f_{1,2}(P(t_1))-f_{1,2}(P(t_2)) \quad (4)$$

Therefore, the RPD is given as a function of the transmit powers of the two time instants. In other words, it is the transmit power change that gives rise to the RPD. For example, there exists no RPD, if the transmit power remains constant, i.e., $P(t_1)=P(t_2)$. It is also found out that, given a certain level of transmit power change, the resulting RPD is determined by the power-dependence of RP. For example, when the RP is independent of the transmit power, i.e., $f_{1,2}(P)=C$ (constant), there exists no RPD.

Figure 6:
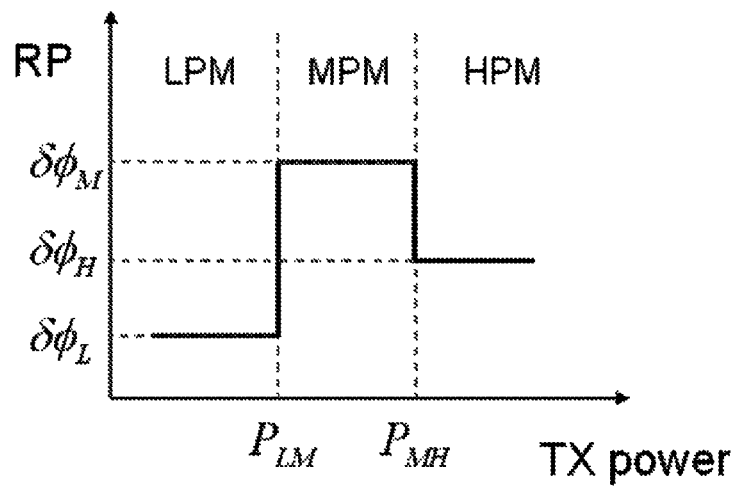
FIG. 6 is an example of UE operation modes.

FIG. 6 shows an example of the relationship between transmit power and RP. It is shown that RP changes abruptly across a few transmit power levels—referred to as switching points hereafter.

In the example of FIG. 6, there are two switching points whose power levels are $P_{LM}$ and $P_{MH}$. There are three operation modes: the operation mode below $P_{LM}$ is called low-power mode (LPM), the operation mode between $P_{LM}$ and $P_{MH}$ is called mid-power mode (MPM) and the operation mode above $P_{MH}$ is called high-power mode (HPM). Each mode has its own bias state and the phase of a bias state is not necessarily equal to those of other bias states. This justifies the aforementioned RP change across the switching points. In other words, the transmit power change causes the mode switching of a transmitter, comprised in the user equipment 120, and the mode switching between SRS and PUSCH in turn causes the RPD.

Figure 7:
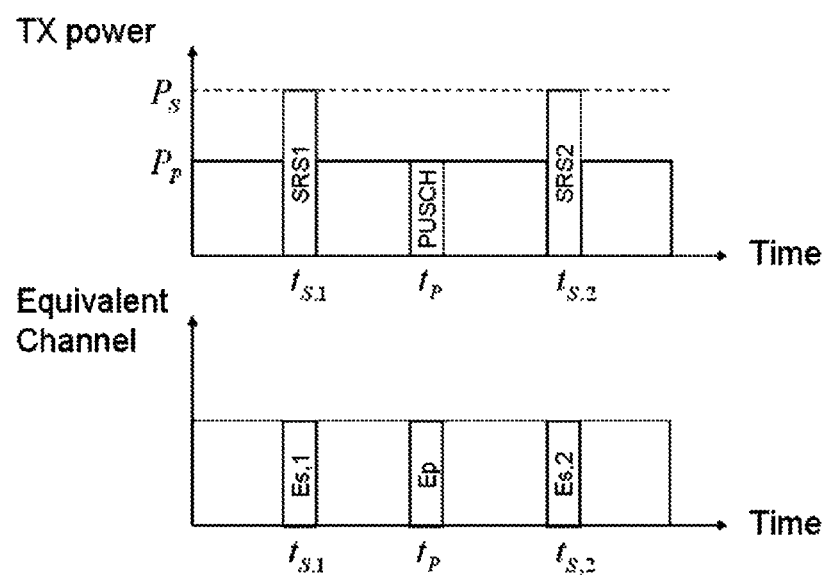
FIG. 7 shows diagrams illustrating an example of PUSCH and SRS transmission.
Figure 8:
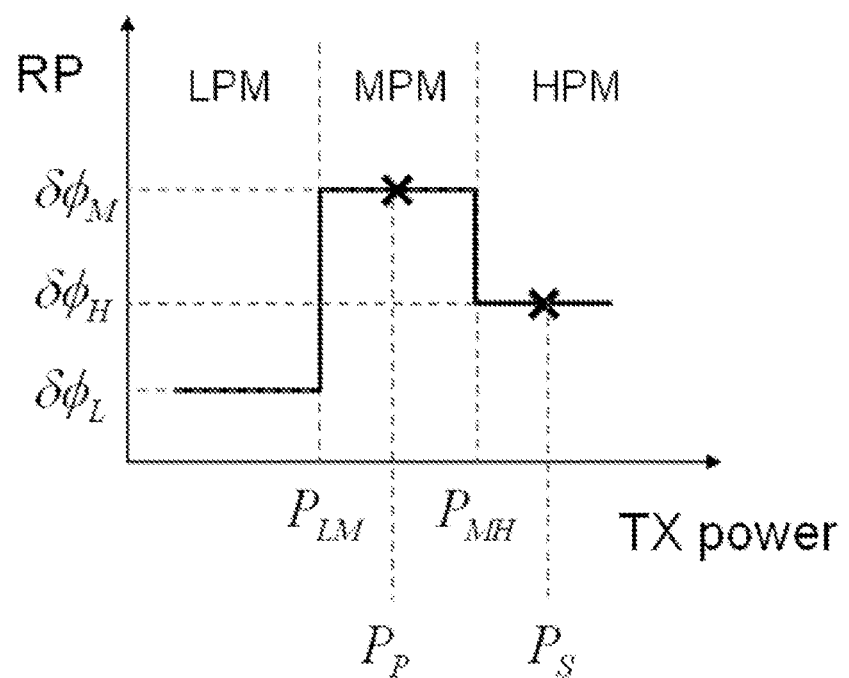
FIG. 8 is a further example of UE operation modes.

FIG. 7 shows a typical case where PUSCH and SRS are transmitted with different power levels. The first SRS symbol, $SRS_1$, is transmitted at time instant $t_{S,1}$ with power level $P_S$ and the second SRS symbols, $SRS_2$, is transmitted at time instant $t_{S,2}$ with power level $P_S$. One of the PUSCH symbols, PUSCH, is transmitted in between, i.e., at time instant $t_P$ with power level $P_P$. Since the PUSCH power level is different from the SRS power level, RPD may occur between SRS and PUSCH. More specifically, the equivalent channels of the symbols, $E_{S,1}$, $E_{S,2}$ and $E_P$, can be given as $$E_{S,1}=H_{S,1}D_S$$

$$E_{S,2}=H_{S,2}D_S$$

$$E_P=H_PD_P \quad (5)$$

where $H_{S,1}$, $H_{S,2}$ and $H_P$ represent the corresponding physical channels and $D_S$ and $D_P$ represent the corresponding phase shifts. The two SRS symbols experience the same phase shift, since they are assumed to have the same power level. It is important to note that $D_S$ and $D_P$ become different when $P_S$ and $P_P$ are on different sides of a switching point, in other words, $SRS_1$ (or $SRS_2$) and PUSCH operate in different modes, as exemplified in FIG. 8. This causes RPD between SRS and PUSCH.

Recall that the precoder selection is generally affected by the phase information of the transmitter branches. Thus it can be understood that the RPD between SRS and PUSCH may degrade the optimality of precoder selection significantly.

According to at least one embodiment of the present disclosure one may select the SRS or PUSCH transmit power based on the UE feedback of switching point information. The switching point information includes the power levels and the phase values of one or more switching points.

The switching point information may be simply the PA type of the UE, e.g., switch mode PA or envelope tracking PA. In order to obtain the switching point information, the UE may need to measure the RP characteristic. Once the eNB obtains the switching point information from the UE, it selects the SRS or PUSCH transmit power so as to reduce the RPD. The SRS transmit power can be adjusted by changing the SRS power offset or the SRS bandwidth. The PUSCH transmit power can be adjusted by using TPC commands. Although some embodiments herein solves some of the problems described earlier, it always relies on the UE feedback of the switching point information. Without the UE feedback, the eNB cannot figure out how to select the SRS or PUSCH transmit power in order to reduce the RPD of the UE.

In case of singe UL transmit antenna the PD may also occur on an UL transmission, e.g. on UL physical channel etc. The embodiments are also applicable to PD in addition to RPD.

In the following, the term "UE" may refer to the user equipment 120 when appropriate.

Method in a Radio Network Node for Obtaining UE Mode Switching Information

This method is primarily performed in the radio network node 110 serving the user equipment 120. Depending upon the network architecture, mechanism to obtain the information, type of technology etc, more than one radio network node 110 may also be involved in obtaining the mode switching information. For example in LTE, it can be performed in eNode B serving the user equipment 120. In HSPA, it may be performed in Node B serving the user equipment 120 or in both Node B and RNC serving the user equipment 120. Other examples of the radio network node are base station, RNC, relay, donor node, MSR node etc.

The term obtaining means that the network node may determine the UE mode switching information by one or more means. These different mechanisms and alternatives are described below:

Obtaining Information Based on Pre-Defined Information

First, the radio network node 110, e.g. eNode B in LTE, may obtain the mode switching information based on pre-defined information, stored in the equipment 120, which includes the switching point information declared by UE vendors in the specification. This may also be called as the vendor declaration or declared information. The vendor-specific switching point information may vary with the model and release of UE. The vendor-specific switching point information may also depend upon the frequency bands, RATs, number of supported RATs, power class of the UE for each RAT etc.

The radio network node 110, e.g. eNode B, BS, Node B, RNC etc, can therefore store the declared information related to the switching point of the UE for different types, classes, models, release etc of UEs. This information can therefore be maintained in the radio network node 110 in the form of a look up table or a data base and it can be used for determining the switching point of a particular UE when it is served by the radio network node 110.

Therefore when a UE is served by the radio network node 110, the radio network node 110 identifies the UE type, class, release etc. After identifying the UE, the radio network node 110 checks the look up table (or database) containing the pre-defined switching point information related to the identified UE.

It should be noted that the vendor and the model can be figured out by the radio network node 110 based on the International Mobile Subscriber Identity/International Mobile Equipment Identity (IMSI/IMEI) of the UE. The network can also determine the release based on the Radio Resource Control (RRC) signaling. The UE reports its release, e.g. that it supports release 11, to the radio network node 110 during a setup or when requested by the network. Also, additional UE information such as supported frequency bands, RATs, power class may be available to the eNB. For example the UE also informs the network about its supported bands, RATs, power class etc. The radio network node 110 may even implicitly determine the UE type based on historical data. For example the UEs with similar performance or behavior in the network can be grouped together and may be assumed to have the same mode switching points.

The radio network node 110 can therefore map the pre-defined switching point information applicable to that of the identified UE. The radio network node 110 therefore eventually chooses the mode switching information of a specific UE from the predefined information.

In case of HSPA the determination of the switching point information may be performed in a RNC for each UE served by the RNC. The RNC may also maintain the pre-defined switching point information. The RNC after determining the switching point information for a UE informs the determined switching point information to the Node B serving that UE.

Obtaining Information Based on Measurements

According to another embodiment the serving radio network node 110 can also measure the UL transmission, e.g., SRS, PUSCH, pilot signals etc, and associate it with the Power Headroom Report (PHR) from the UE to obtain the mode switching information. PHR or aka PH is the difference between the UE maximum power and the UE transmitted power expressed in dB scale. During the UL transmission, the eNB can measure the RP of the UE. For example, the consecutive SRS transmissions enable the eNB to measure the RP, when the fading channel remains static between the SRS transmissions. When the PHR indicates that the SRS transmit power changes between the SRS transmissions, it is possible to find the power level and phase value of the switching point.

The radio network node 110 may determine the mode switching information of a UE and use the same information for other similar UEs i.e. UEs of the same type in terms of performance, model, power class, supported bands, supported RATs etc. Therefore the switching point information can be determined by the radio network node 110 for certain number of UEs and can be stored in the node and used for the same and similar types of the UEs in the future e.g. for scheduling etc.

Similarly, it is possible for the radio network node 110 to collect the mode switching information from the UEs of the same type. This helps to improve the accuracy of the mode switching information. For example, when one UE has the SRS transmit power crossing one switching point and the other UE of the same type has the SRS transmit power crossing another switching point, it is possible to obtain the information on these two switching points for the UEs of the same type. In other words, by collecting the measurements from the UEs of the same type that operate in different modes, it is possible to obtain the complete mode switching information of UEs of the type. This may be useful when the SRS transmit power does not change so rapidly and it is practically impossible to obtain the complete mode switching information from the measurement of a single UE.

Obtaining Information Based on Scanning UL Transmit Power Range

According to this embodiment the radio network node 110 may obtain the mode switching information by scanning the transmit power range of interest and measure the corresponding RP. For example, the eNB ramps up the SRS transmit power monotonically and measures the corresponding RP. If the SRS transmit power ranges from the minimum transmit power to the maximum transmit power, it is possible to capture the complete switching point information. Alternatively, the eNB may ramp down the SRS transmit power monotonically and measures the corresponding RP i.e. from maximum to minimum UE transmit power. The radio network node 110 may apply this procedure when there is low uplink traffic in the cell and/or when UE is not transmitting any data. In this way the network can more accurately determine the mode switching information by assigning adequate resources.

There are several ways of ramping up/down the SRS transmit power, since the SRS transmit power is determined by parameters such as the SRS bandwidth and the desired target SNR value etc. For example, by changing the SRS bandwidth, it is possible to fulfill the power ramp up/down. Note that such power ramp up/down can be fulfilled on a per subframe basis, if aperiodic SRS is used.

The power step of the aforementioned power ramp up/down determines the amount of the SRS resource. In order to reduce the required SRS resource, the radio network node 110 can select the power step based on the declared information. For example, if the radio network node 110 can figure out the approximated power level difference between two switching points, it can adjust the power step accordingly.

The radio network node 110 may determine the mode switching information of a UE by scanning and use the same information for other similar UEs i.e. UEs of the same type in terms of performance, model, power class, supported bands, supported RATs etc. Therefore the switching point information can be determined by the radio network node 110 for certain number of UEs based on scanning and can be stored in the node and used for the same and similar types of the UEs in future e.g. for scheduling etc.

Similarly, it is possible for the radio network node 110 to collect the mode switching information from the UEs of the same type. This helps to improve the accuracy of the mode switching information. For example, when the radio network node 110 scans the first half of the transmit power range for one UE and scans the second half of the transmit power range for another UE of the same type, it is possible to obtain the information on these transmit power ranges for the UEs of the same type. In other words, by collecting the power ramp up/down from the UEs of the same type that operate in different modes, it is possible to obtain the complete mode switching information of UEs of the type. This may be useful when the SRS resource dedicated to each UE is not enough to scan the whole transmit power range and it is practically impossible to obtain the complete mode switching information from the power ramp up/down of a single UE.

If the radio network node 110 aims to reduce the RPD further, it may want to scan the transmit power range for each UE, even when the mode switching information is available from other UEs of the same type. In this case, the mode switching information obtained from other UEs of the same type can be used as initial information, for example, to optimize the power step for the power ramp up/down of a UE of the same type.

Obtaining Information Based on Explicit Indication from UE

According to yet another embodiment the radio network node 110 obtains the mode switching information based on explicit indication from the UE. In this case, the mode switching information can be acquired by the radio network node 110 from the UE which may contain the pre-determined information stored in the UE, Alternatively when the radio network node 110 requests the mode switching information or when the UE has to send the mode switching information to the radio network node 110 then the UE performs certain radio measurement to first obtain the mode switching information. In the next step the UE report the determined mode switching information to the radio network node 110. For example the UE may perform measurements such as UL transmit power to determine the mode switching information. Such a network-triggered UE measurement and report may help reduce UE power consumption, for example, when the radio network node 110 can obtain the mode switching information from the UEs of the same type and wants to reuse the information for other UEs of the same type.

The UE may signal the mode switching information which may be specific for different RATs, bands, UE power class etc. For example if UE supports LTE and HSPA, then it may report mode switching information for each RAT. Alternatively it may report one common mode switching information for all RATs.

The UE may send the mode switching information to the radio network node 110 in any of the following manner:

- Proactive reporting without receiving any explicit request from the radio network node 110, e.g. serving or any target network node.
- Reporting upon receiving any explicit request from the radio network node 110, e.g. serving or any target network node.
- The explicit request can be sent to the UE by the network anytime or at any specific occasion. For example the request for the mode switching information reporting can be sent to the UE during initial setup or after a cell change, e.g. handover, RRC connection re-establishment, RRC connection release with redirection, PCell change in CA, PCC change in PCC etc.

In case of proactive reporting the UE may report its mode switching information during one or more of the following occasions:

- During initial setup or call setup e.g. when establishing the RRC connection
- During cell change e.g. handover, primary carrier change in multi-carrier operation, PCell change in multi-carrier operation, RRC re-establishment, RRC connection release with redirection etc.
- During UL transmission mode change, e.g., when a UE moves from single-antenna mode to multiple-antenna mode.

The radio network node 110 receiving the mode switching information from a UE may store the received information and may use this also for similar UEs which don't signal their own mode switching information.

The term similar UE implies the UEs of the same type in terms of performance, model, power class, supported bands, supported RATs etc. The similarity between UEs can be determined using the mechanism described earlier, for example by the method of obtaining information through pre-defined information. The similar UE types are expected to have the same mode switching capability. This approach also reduces the signaling overheads since all UEs don't have to signal their mode switching information to the radio network node 110.

Obtaining Information Based on Common Radio in Multi-RAT UE

According to this embodiment the radio network node 110 may obtain the mode switching information of a UE for certain RAT, e.g. LTE, using any of the methods disclosed above. Let us call this RAT as reference RAT. The radio network node 110 then observes the radio transmitter performance of that UE when it operates on another RAT. Example of radio transmitter performance is accuracy or tolerance of the UE maximum output power. If the performance on the two RATs are the same or similar then the network may assume that the same mode switching information is applicable on both RATs. For example only LTE part of the multi-RAT (HSPA/LTE) UE may explicitly indicate its mode switching information to the radio network node 110. However the HSPA and LTE may use a common radio and therefore mode switching information may be the same for both RATs.

Method in a Radio Network Node of Adapting UL Transmission Based on the Obtained UE Mode Switching Information The radio network node 110 upon determining the UE mode switching information adapts the UL transmission of the UE to improve the UL performance e.g. improving UL reception quality at the radio network node 110, UL detection performance at the radio network node 110 etc. For example all UEs may not have multi-stage PA, e.g., envelope tracking PA, and therefore there is no mode switching for this UE when UE transmits signals in the uplink. The radio network node 110 therefore adapts the UL transmission only of those UEs which does mode switching and whose mode switching information is available.

The examples of the adaptation of the signals transmitted by the UE in the UL are provided in the following sections. The radio network node 110 may apply one or combinations of these adaptations.

Adaptation of UL Power Control Parameters

The serving radio network node serving the UE typically selects the UL PC parameters for this UE based on UL received signal quality. However according to this embodiment the radio network node 110 also takes into account the mode switching information of the UE when selecting the UL PC parameters.

Therefore in this exemplary embodiment the adaptation of UL transmission includes the adaptation of the power control related parameters configured by the radio network node 110, e.g. the TPC commands, the resource allocation, such as the SRS or PUSCH bandwidth, the SRS power offset etc. As an example the parameter related to resource allocation can be UL grant or aka UL scheduling grant or UL assigned resource etc. Some of the parameters, for example, the parameters related to SRS configuration can be adapted on a per subframe basis, if aperiodic SRS is configured with different parameters.

These UL PC parameters which can be adapted are signaled to the UE and can be updated by the network serving the UE. For example, given the power levels of the switching points, it is possible for the network to adjust one or more parameters related to the UL PC. This in turn can enable the UE to adapt the SRS or PUSCH transmit power such that there is no mode switching between SRS and PUSCH. Obviously, this may help to reduce the RPD. In addition, given the phase values of the switching points, further optimization of RPD is possible. Note that any parameters used as the input argument of the power control formula can be involved in the adaptation of the UL transmission.

Method in a UE of Autonomously Adapting UL Transmission to Account for UE Mode Switching According to this embodiment the UE determines the mode switching information related to its multi-stage radio implementation for the UL transmission and autonomously adapts its UL transmission in order to avoid the UL transmitted signal causing higher RPD. This in turn will enable the serving node to more easily receive and decode the UL signal transmitted by the UE. For example the UE can apply any one or more of the UL adaptations disclosed above according to one or more pre-defined rules.

Method in a Radio Network Node of Forwarding the Obtaining UE Mode Switching Information and/or UL Adaptation to Other Nodes According to this embodiment the radio network node 110 signals or forwards to other network nodes any information, parameters, results or statistics related to the:

UE mode switching to other network nodes and/or
adaptation of the UL transmission by for example accounting for the UE mode switching For example the information forwarded to other nodes may include any information obtained by the radio network node according to e.g. action 301.

As will be readily understood by those familiar with communications receiver design, the several functional blocks of FIG. 3, as well as one or more functions from other receiver circuits may be implemented using digital logic and/or one or more microcontrollers, microprocessors, or other digital hardware. In some embodiments, several or all of the various functions of receiver circuits in FIG. 3 may be implemented together, such as in a single application-specific integrated circuit (ASIC), or in two or more separate devices with appropriate hardware and/or software interfaces between them. Several of the functional blocks of receiver circuits in FIG. 3 may be implemented on a processor shared with other functional components of a wireless terminal.

Alternatively, several of the functional elements of the receiver processing circuits discussed above may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

Positioning Overview

Several positioning methods for determining the location of the target device, which can be any of the wireless device or UE, mobile relay, PDA etc exist. The position of the target device is determined by using one or more positioning measurements, which can be performed by a suitable measuring node or device. Depending upon the positioning the measuring node can either be the target device itself, a separate radio node (i.e. a standalone node), serving and/or neighboring node of the target device etc. Also depending upon the positioning method the measurements can be performed by one or more types of measuring nodes. Some exemplary positioning methods are:

Satellite based methods: In this case the measurements performed by the target device on signals received from the navigational satellites are used for determining target device's location. For example either GNSS or A-GNSS (e.g. A-GPS, Galileo, COMPASS etc) measurements are used for determining the UE position Observed Time Difference of Arrival (OTDOA): This method uses UE measurement related to time difference of arrival of signals from radio nodes, e.g. User Equipment Reference Signal Time Difference (UE RSTD) measurement, for determining UE position in LTE or SFN-SFN type 2 in HSPA.

Uplink Time Difference of Arrival (UTDOA): It uses measurements done at a measuring node, e.g. a Location Measurement Unit (LMU), on signals transmitted by a UE. The LMU measurement is used for determining the UE position.

Enhanced cell ID: It uses one or more of measurements for determining the UE position e.g. any combination of UE Rx-Tx time difference, BS Rx-Tx time difference, timing advanced, LTE RSRP/RSRQ, HSPA CPICH measurements (CPICH RSCP/Ec/No), angle of arrival (AoA) etc for determining UE position.

Hybrid methods: It relies on measurements obtained using more than one positioning method for determining the UE position In LTE the positioning node, aka Evolved Serving Mobile Location Center (E-SMLC) or location server, configures the UE, eNode B or LMU to perform one or more positioning measurements depending upon the positioning method. The positioning measurements are used by the UE or by a measuring node or by the positioning node to determine the UE location. In LTE the positioning node communicates with UE using LTE Positioning Protocol (LPP) protocol and with eNode B using LTE Positioning Protocol A (LPPa) protocol.

Although the uplink channel of Third Generation Partnership Project (3GPP) Long Term Evolution (LTE) is assumed in this disclosure to exemplify the embodiments herein, this should not be seen as limiting the scope of as defined by the appended claims to only the aforementioned system. Other wireless systems, including Wideband Code Division Multiple Access (WCDMA), High Speed Packet Access (HSPA), Universal Terrestrial Radio Access (UTRA) Frequency Division Duplex (FDD), UTRA Time Division Duplex (TDD), WiMax, Ultra Mobile Broadband (UMB), Global System for Mobile Communication (GSM), GSM Enhanced Data Rates for GSM Evolution (EDGE) Radio Access Network (GERAN) and Wireless Local Area Network (WLAN), may also benefit from exploiting the ideas presented within this disclosure.

Terminologies such as eNB and UE should be considered non-limiting and does not imply a certain hierarchical relation between the two; in general, "eNB" could be considered as device 1 and "UE" device 2, and these two devices communicate with each other over some radio channel.

The embodiments herein are applicable to any type of radio network node e.g. base station, eNode B, multi-standard radio (MSR) radio node, Node B, access point relay, donor node serving or controlling a relay etc. Similarly the embodiments herein are applicable to any type of user equipment e.g. target device, mobile terminal, wireless terminal, wireless terminal used for machine type communication, wireless device used for device to device communication etc.

It should be noted that transmit diversity can be regarded as a special case of the multiple input multiple output (MIMO) transmission scheme, which can also be used in the uplink. Hence, although the main focus of the disclosure is on uplink transmit diversity, the concept can be extended or applied to any MIMO scheme.

The embodiments herein also apply to multi-point carrier aggregation systems i.e. are applicable to each CC in CA or in CA combination with CoMP etc.

The embodiments are applicable to transmission on each CC in CA and/or CoMP.

MIMO Transmission

MIMO is a key element of an air interface for high-speed wireless communications for many wireless communication technologies such as Long Term Evolution (LTE) and High Speed Packet Access (HSPA). MIMO can use the diversity in the channel to provide multiplexing gain by enabling the simultaneous transmission of multiple streams known as layers. In LTE and HSPA, MIMO is used both in downlink (DL) and uplink (UL) aka DL MIMO and UL MIMO respectively.

Denoting the number of transmit antennas, receive antennas, and layers by NT, NR, and R, respectively, R is never greater than NT (and, often, smaller or equal to NR). One possible implementation of MIMO uses a precoder, often expressed mathematically as a left-multiplication of a layer signal vector (R×1) by a precoding matrix (NT×R), which is chosen from a pre-defined set of matrices, a so-called codebook exemplified in FIG. 9 and FIG. 10. Each precoding matrix is indexed by rank indicator (RI) and precoding matrix indicator (PMI). (Note that the r-th column vector of the precoding matrix represents the antenna spreading weight of the r-th layer.) The precoding matrix usually consists of linearly-independent columns, and thus R is referred to as the rank of codebook. One purpose of this kind of precoder is to match the precoding matrix with the Channel State Information (CSI) so as to increase the received signal power and also to some extent reduce inter-layer interference, thereby improving the Signal-to-Interference-plus-Noise-Ratio (SINR) of each layer. In the DL the CSI is measured or estimated by the UE on DL radio signals (e.g. reference signals) and reporting to the serving radio node. In the UL the CSI is measured or estimated by the serving radio node on UL signals (e.g. reference signal) transmitted by the UE. One examples of UL CSI are UL SINR etc. Examples of DL CSI in LTE are CQI, RI and PMI. Examples of DL CSI in HSPA are CQI and pre-coding indicator (PCI). Consequently, the precoder selection requires the transmitter to know the channel properties and, generally speaking, the more accurate the CSI, the better the precoder matches.

In the case of 3GPP LTE UL, precoder selection is made by the receiver, such as an eNB, so that there is no need for feeding channel information back to the transmitter. Here, precoder selection includes not only rank selection but precoding matrix selection throughout this disclosure. Instead, it is necessary for the receiver to obtain channel information, which can usually be facilitated by transmitting a known signal, in the case of LTE UL, the Demodulation Reference Signal (DM-RS) and the Sounding Reference Signal (SRS). Both DM-RS and SRS are defined in frequency domain and derived from Zadoff-Chu sequence. However, since the DM-RS is precoded, while the SRS is not precoded, the channel information obtained from DM-RS is the equivalent channel that the R layers experience, not the physical channel that the NT antennas experience. Therefore, the precoder selection is preferably based on SRS, since it is possible to obtain the physical channel through SRS.

The uplink transmit diversity is also a special type of UL multi antenna transmission. It is specified for LTE and being specified for HSPA in release 11.

The baseline and typical UE implementation comprises of a single uplink transmit antenna used for all types of uplink transmission.

However, high end UEs may have and use multiple uplink transmit antennas for uplink transmission. This is commonly referred to as uplink transmit diversity. The objective of the transmit diversity transmission is to achieve higher uplink data rate and lower UE transmission power by the virtue of spatial, angular and temporal diversities.

The most common uplink transmit diversity consists of two uplink transmit antennas. The signals from two or more uplink transmit diversity antennas may be transmitted in different manner in terms of their phases, amplitude, power etc. This gives rise to different uplink transmit diversity schemes. Some exemplary schemes are:

Transmit beam forming open loop
Transmit beam forming closed loop
Switched antenna uplink transmit diversity open loop
Switched antenna uplink transmit diversity closed loop
Space time transmit diversity Multi-Carrier or Carrier Aggregation Concept To enhance peak-rates within a technology, multi-carrier or carrier aggregation may be used. For example, it is possible to use multiple 5 MHz carriers in HSPA to enhance the peak-rate within the HSPA network. Similarly in LTE for example multiple 20 MHz carriers or even smaller carriers (e.g. 5 MHz) can be aggregated in the UL and/or on DL. Each carrier in multi-carrier or carrier aggregation system is generally termed as a Component Carrier (CC) or sometimes is also referred to a cell. In simple words the CC means an individual carrier in a multi-carrier system. The term Carrier Aggregation (CA) is also called (e.g. interchangeably called) "multi-carrier system", "multi-cell operation", "multi-carrier operation", "multi-carrier" transmission and/or reception. This means the CA is used for transmission of signaling and data in the uplink and downlink directions. One of the CCs is the primary component carrier (PCC) or primary carrier or anchor carrier. The remaining ones are called secondary component carrier (SCC) or secondary carriers or supplementary carriers. Generally the primary or anchor CC carries the essential UE specific signaling. The primary CC exists in both uplink and direction CA. The network may assign different primary carriers to different UEs operating in the same sector or cell.

Therefore the UE has more than one serving cell in downlink and/or in the uplink: one primary serving cell and one or more secondary serving cells operating on the PCC and SCC respectively. The serving cell is interchangeably called as primary cell (PCell) or primary serving cell (PSC). Similarly the secondary serving cell is interchangeably called as secondary cell (SCell) or secondary serving cell (SSC). Regardless of the terminology, the PCell and SCell(s) enable the UE to receive and/or transmit data. More specifically the PCell and SCell exist in DL and UL for the reception and transmission of data by the UE. The remaining non-serving cells on the PCC and SCC are called neighbor cells.

The CCs belonging to the CA may belong to the same frequency band (aka intra-band CA) or to different frequency band (inter-band CA) or any combination thereof (e.g. 2 CCs in band A and 1 CC in band B). The inter-band CA comprising of carriers distributed over two bands is also called as dual-band-dual-carrier-HSDPA (DB-DC-HSDPA) in HSPA or inter-band CA in LTE. Furthermore the CCs in intra-band CA may be adjacent or non-adjacent in frequency domain (aka intra-band non-adjacent CA). A hybrid CA comprising of intra-band adjacent, intra-band non-adjacent and inter-band is also possible. Using carrier aggregation between carriers of different technologies is also referred to as "multi-RAT carrier aggregation" or "multi-RAT-multi-carrier system" or simply "inter-RAT carrier aggregation", where RAT is short for Radio Access Technology. For example, the carriers from WCDMA and LTE may be aggregated. Another example is the aggregation of LTE and Code Division Multiple Access 2000 (CDMA2000) carriers. For the sake of clarity the carrier aggregation within the same technology as described can be regarded as 'intra-RAT' or simply 'single RAT' carrier aggregation.

The multi-carrier operation may also be used in conjunction with multi-antenna transmission. For example signals on each CC may be transmitted by the eNB to the UE over two or more antennas.

The CCs in CA may or may not be co-located in the same site or base station or radio network node (e.g. relay, mobile relay etc). For instance the CCs may originate (i.e. transmitted/received) at different locations (e.g. from non-located BS or from BS and RRH or RRU). Examples of combined CA and multi-point communication are Distributed Antenna System (DAS), RRH, RRU, Coordinated Multiple Point Transmission and Reception (CoMP), multi-point transmission/reception etc.

Figure 11:
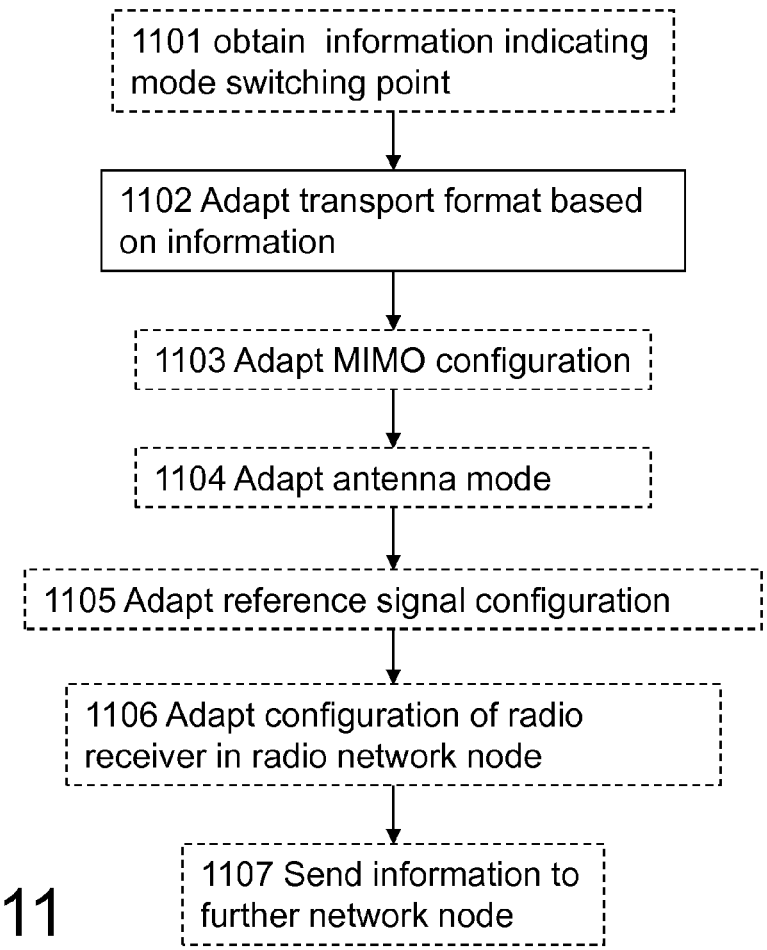
FIG. 11 is a flowchart illustrating an exemplifying method in the radio network node according to embodiments herein.

FIG. 11 shows a flowchart of an exemplifying method, performed by the radio network node 110, for managing the transmission from the user equipment 120 to the radio network node 110. The following actions may be performed in any suitable order.

Action 1101

The radio network node 110 may obtain the information indicating at least one mode switching point based on one or more of:

pre-defined information;
measurements performed by the radio network node 110;
a procedure for scanning, by the radio network node 110, transmit power range of the user equipment 120; and
an indication received from the user equipment 120.

The obtained information may relate to a first radio access technology, wherein the user equipment 120 is capable of at least the first radio access technology and a second radio access technology, wherein the method further comprises obtaining second information relating to the second radio access technology based on the information indicating at least one mode switching point for the first radio access technology provided that radio transmission characteristics for the first radio access technology is similar to radio transmission characteristics for the second radio access technology, wherein the second information indicates at least one mode switching point of the radio transmitter 1420.

This action is similar to action 301.

Action 1102

The radio network node 110 adapts a transport format relating to the transmission based on information indicating at least one mode switching point of a radio transmitter 1420. The radio transmitter 1420 is comprised in the user equipment 120.

As mentioned, the radio transmitter 1420 may comprise a first power amplifier 421 and a second power amplifier 422. The at least one mode switching point may indicate when, in terms of transmit power of the radio transmitter 1420, the radio transmitter 1420 switches from a first mode, in which the first power amplifier is operated, to a second mode, in which the second power amplifier is operated.

This action is similar to action 302.

Action 1103

The radio network node 110 may perform one or more of:

adapting a MIMO configuration of the user equipment 120 based on the information, wherein the MIMO configuration relates to the transmission;

adapting an antenna mode of the user equipment 120 based on the information, which antenna mode relates to the transmission;

adapting a reference signal configuration relating to the transmission based on the information; and adapting a configuration of a radio receiver 1230 comprised in the radio network node 110 based on the information.

This action is similar to one or more of actions 303, 304, 305 and 306.

Action 1107

The radio network node 110 may send the information to a further network node, which uses the information for transmission between the user equipment 120 and the further network node. This action is similar to action 307.

FIG. 12 shows an exemplifying radio network node 110 which is configured to manage the transmission from the user equipment 120 to the radio network node 110.

The radio network node 110 comprises a processing circuit 1210 configured to adapt a transport format relating to the transmission based on information indicating at least one mode switching point of the radio transmitter 1420. The radio transmitter 1420 is comprised in the user equipment 120.

The processing circuit 1210 may further be configured to obtain the information indicating the at least one mode switching point of the radio transmitter 1420 based on one or more of:

pre-defined information;
measurements performed by the radio network node 110;
a procedure for scanning, by the radio network node 110, transmit power range of the user equipment 120; and
an indication received from the user equipment 120.

The obtained information relates to a first radio access technology, wherein the user equipment 120 is capable of at least the first radio access technology and a second radio access technology, wherein the processing circuit 1210 further is configured to obtain second information relating to the second radio access technology based on the information for the first radio access technology provided that radio transmission characteristics for the first radio access technology is similar to radio transmission characteristics for the second radio access technology, wherein the second information indicates at least one mode switching point of the radio transmitter 1420.

The processing circuit 1210 may further be configured to one or more of:

adapt a MIMO configuration of the user equipment 120 based on the information, wherein the MIMO configuration relates to the transmission;

adapt an antenna mode of the user equipment 120 based on the information, which antenna mode relates to the transmission;

adapt a reference signal configuration relating to the transmission based on the information; and adapt a configuration of a radio receiver 1230 comprised in the radio network node 110 based on the information.

The processing circuit 1210 may further be configured to send the information to a further network node, which is capable of using the information for transmission between the user equipment 120 and the further network node.

The radio network node 110 further comprises a transmitter 1220, which may be configured to send one or more of the information indicating the at least one mode switching point, explicit configuration information and/or other numbers, values or parameters described herein.

The radio network node 110 further comprises a receiver 1230, which may be configured to receive one or more of the information indicating the at least one mode switching point, the information relating the transmission adapted by the user equipment and/or other numbers, values or parameters described herein.

The radio network node 110 further comprises a memory 1240 for storing software to be executed by, for example, the processing circuit. The software may comprise instructions to enable the processing circuit to perform the method in the radio network node 110 as described above in conjunction with FIGS. 3 and/or 11.

Figure 13:
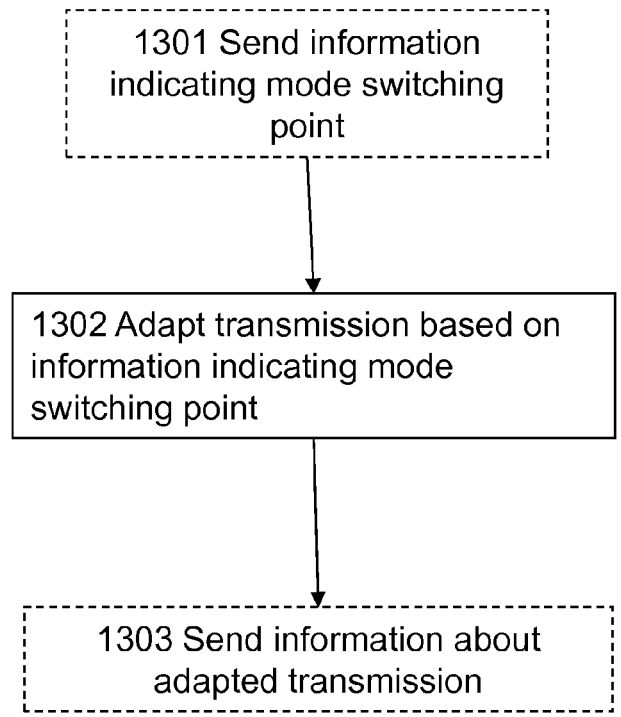
FIG. 13 is a flowchart illustrating an exemplifying method in the user equipment according to embodiments herein.

FIG. 13 shows a flowchart of an exemplifying method, performed by the user equipment 120, for managing a transmission from the user equipment 120 to the radio network node 110. The following actions may be performed in any suitable order.

Action 1301

The user equipment 120 may send the information indicating at least one mode switching point to the radio network node 110. This action is similar to action 310.

Action 1302

The user equipment 120 adapts the transmission based on information, wherein the information indicates at least one mode switching point of a radio transmitter 1420 comprised in the user equipment 120. This action is similar to action 311.

The adapting of the transmission may further comprise adapting a value relating to the transmission based on the information, wherein the value comprises one or more of:

one or more power control parameters relating to the transmission;

a transport format relating to the transmission;

a MIMO configuration of the user equipment 120, wherein the MIMO configuration relates to the transmission;

an antenna mode of the user equipment 120, which antenna mode relates to the transmission;

a reference signal configuration relating to the transmission; and a configuration of a radio receiver 1230 comprised in the radio network node 110.

The adapting of the transmission may be performed when the information indicates that a relative phase discontinuity of transmission exceeds a threshold value.

The adapting of the transmission may be performed provided the user equipment 120 is explicitly configured, by the radio network node 110, to be allowed to perform the adapting 311 of the transmission.

Action 1303

The user equipment 120 may send information relating to the adapted transmission to the radio network node 110. This action is similar to action 312.

FIG. 14 shows an exemplifying user equipment 120 which is configured to manage the transmission from the user equipment 120 to the radio network node 110.

The user equipment 120 comprises a processing circuit 1410 configured to adapt the transmission based on information. The information indicates at least one mode switching point of a radio transmitter 1420 comprised in the user equipment 120.

The processing circuit 1410 may further be configured to adapt a value relating to the transmission based on the information. The value comprises one or more of:

one or more power control parameters relating to the transmission;

a transport format relating to the transmission;

a MIMO configuration of the user equipment 120, wherein the MIMO configuration relates to the transmission;

an antenna mode of the user equipment 120, which antenna mode relates to the transmission;

a reference signal configuration relating to the transmission; and a configuration of a radio receiver 1230 comprised in the radio network node 110.

The processing circuit 1410 may further be configured to send information relating to the adapted transmission to the radio network node 110.

The processing circuit 1410 may further be configured to send the information indicating at least one mode switching point to the radio network node 110.

The processing circuit 1410 may further be configured to adapt the uplink transmission when the information indicates that a relative phase discontinuity of uplink transmission exceeds a threshold value for indicating relative phase discontinuity.

The processing circuit 1410 may further be configured to adapt the uplink transmission provided the user equipment 120 is explicitly configured, by the radio network node 110, to be allowed to adapt the uplink transmission.

The user equipment 120 further comprises a transmitter 1420, which may be configured to send one or more of the information indicating the at least one mode switching point, the information relating the transmission adapted by the user equipment and/or other numbers, values or parameters described herein.

The user equipment 120 further comprises a receiver 1430, which may be configured to receive one or more of the explicit information for allowing autonomous adaption of the transmission information indicating the at least one mode switching point and/or other numbers, values or parameters described herein.

The user equipment 120 further comprises a memory 1440 for storing software to be executed by, for example, the processing circuit. The software may comprise instructions to enable the processing circuit to perform the method in the user equipment 120 as described above in conjunction with FIGS. 3 and/or 13.

As used herein, the term "processing circuit" may refer to a processing unit, a processor, an application specific integrated circuit (ASIC), a field-programmable gate array (FPGA) or the like. As an example, a processor, an ASIC, an FPGA or the like may comprise one or more processor kernels.

As used herein, the term "memory" may refer to a hard disk, a magnetic storage medium, a portable computer diskette or disc, flash memory, random access memory (RAM) or the like. Furthermore, "memory" may refer to an internal register memory of a processor.

It will be appreciated that the foregoing description and the accompanying drawings represent non-limiting examples of the methods and apparatus taught herein. As such, the embodiments herein are not limited by the foregoing description and accompanying drawings. Instead, the present invention is limited only by the appended claims and their legal equivalents.

Yet further aspects, as well as the aspects described above are summarized in the following sections.

According to different aspects the present disclosure comprises methods and apparatuses for determining the mode switching information of a radio transmitter and adapting the transmission to improve the reception performance.

According to one embodiment the transmitter is located in a user equipment, and the signals transmitted are received in a base station, such as an eNodeB.

According to another aspect a method in a radio network node serving a UE comprises the steps of:
  obtaining the UE's radio transmitter mode switching information; and
  adapting the UL transmission related to the UE to improve UL reception quality According to further aspects a radio network node is disclosed provided with circuitry to obtain the UE radio transmitter mode switching information and adapt the UL transmission.

According to further aspects the radio network node may obtain the radio transmitter mode switching information based on one or more of the following means:
  a pre-defined information
  using measurements on the UL transmission, e.g., SRS and Physical Uplink Shared Channel (PUSCH) and associate it with the Power Headroom Report (PHR) from the UE)
  scanning the transmit power range of interest and measure e.g. the corresponding relative phase (RP)
  receiving an explicit information from the UE; UE can determine it based on pre-determined information stored in the UE or the relevant UE measurements.

According to further aspects adapting the UL transmission related to the UE to improve UL reception quality, may comprise one or more of:
  the adaptation of one or more parameters related to UL physical channel or signals,
  UL power control, UL reference signals,
  UL transport format,
  UL receiver characteristics etc.

According to further aspects of the present disclosure a method in a radio network node further comprises the steps of:
  obtaining an information related to the UE's radio transmitter mode switching and/or adaption of UL transmission of the UE; and
  forwarding the obtained information to other network nodes which may use it for radio management tasks.

According to yet other aspects a method in a UE served by a radio network node comprises the steps of:
  determining information related to its radio transmitter mode switching;
  signaling the determined mode switching information to the radio network node and/or
  autonomously adapting one or parameters related to UL transmission depending upon the determined mode switching information, which autonomous adaptation is based on one or more pre-defined rules.

What is claimed is:

1. A method, performed by a radio network node, for managing a transmission from a user equipment to the radio network node, the method comprising:
  adapting, by a processing circuit of the radio network node, a transport format relating to the transmission based on information indicating at least one mode switching point of a radio transmitter, wherein the radio transmitter is comprised in the user equipment, and
  wherein at which said at least one mode switching point a corresponding relative phase discontinuity or phase discontinuity of the radio transmitter changes abruptly, wherein the adapting of the transport format comprises selecting a more robust transport format in view of a less robust transport format selected for the transmission when the information indicating at least one mode switching point is not accounted for.

2. The method according to claim 1, further comprising:
  obtaining the information based on one or more of:
  pre-defined information;
  measurements performed by the radio network node;
  a procedure for scanning, by the radio network node, transmit power range of the user equipment; and
  an indication received from the user equipment.

3. The method according to claim 2, wherein the obtained information relates to a first radio access technology, wherein the user equipment is capable of at least the first radio access technology and a second radio access technology, wherein the method further comprises obtaining second information relating to the second radio access technology based on the information for the first radio access technology provided that radio transmission characteristics for the first radio access technology is similar to radio transmission characteristics for the second radio access technology, wherein the second information indicates at least one mode switching point of the radio transmitter.

4. The method according to claim 1, further comprising one or more of:
  adapting a Multiple-Input-Multiple-Output (MIMO) configuration of the user equipment based on the information, wherein the MIMO configuration relates to the transmission;
  adapting an antenna mode of the user equipment based on the information, which antenna mode relates to the transmission;
  adapting a reference signal configuration relating to the transmission based on the information; and
  adapting a configuration of a radio receiver comprised in the radio network node based on the information.

5. The method according to claim 1, further comprising:
  sending the information to a further network node, which uses the information for transmission between the user equipment and the further network node.

6. The method according to claim 1, wherein the radio transmitter comprises a first power amplifier and a second power amplifier, wherein the at least one mode switching point indicates when, in terms of transmit power of the radio transmitter, the radio transmitter switches from a first mode, in which the first power amplifier is operated, to a second mode, in which the second power amplifier is operated.

7. A method, performed by a user equipment, for managing a transmission from the user equipment to a radio network node, comprising:
  adapting, by a processing circuit of the user equipment, the transmission based on information, wherein the information indicates at least one mode switching point of a radio transmitter comprised in the user equipment, and
  wherein at which said at least one mode switching point a corresponding relative phase discontinuity or phase discontinuity of the radio transmitter changes abruptly, wherein the adapting of the transmission further comprises adapting a value relating to the transmission based on the information indicating at least one mode switching point, wherein the value comprises a transport format relating to the transmission, wherein the adapting the value comprising the transport format comprises selecting a more robust transport format in view of a less robust transport format selected for the transmission when the information indicating at least one mode switching point is not accounted for.

8. The method according to claim 7, wherein the adapting of the transmission further comprises adapting a value relating to the transmission based on the information indicating at least one mode switching point, wherein the value comprises one or more of:
- one or more power control parameters relating to the transmission;
- a transport format relating to the transmission;
- a Multiple-Input-Multiple-Output (MIMO) configuration of the user equipment, wherein the MIMO configuration relates to the transmission;
- an antenna mode of the user equipment, which antenna mode relates to the transmission;
- a reference signal configuration relating to the transmission; and
- a configuration of a radio receiver comprised in the radio network node.

9. The method according to claim 7, further comprising:
sending information relating to the adapted transmission to the radio network node.

10. The method according to claim 7, further comprising:
sending the information indicating at least one mode switching point to the radio network node.

11. The method according to claim 7, wherein the adapting of the transmission is performed when the information indicates that a relative phase discontinuity of transmission exceeds a threshold value.

12. The method according to claim 11, wherein the adapting of the transmission is performed provided the user equipment is explicitly configured, by the radio network node, to be allowed to perform the adapting of the transmission.

13. The method according to claim 7, wherein the radio transmitter comprises a first power amplifier and a second power amplifier, wherein the at least one mode switching point indicates when, in terms of transmit power of the radio transmitter, the radio transmitter switches from a first mode, in which the first power amplifier is operated, to a second mode, in which the second power amplifier is operated.

14. A radio network node configured to manage a transmission from a user equipment to the radio network node, comprising:
a processing circuit configured to adapt a transport format relating to the transmission based on information indicating at least one mode switching point of a radio transmitter, wherein the radio transmitter is comprised in the user equipment;
wherein the processing circuit is comprised in the radio network node, and
wherein at which said at least one mode switching point a corresponding relative phase discontinuity or phase discontinuity of the radio transmitter changes abruptly, wherein the adapting of the transport format comprises selecting a more robust transport format in view of a less robust transport format selected for the transmission when the information indicating at least one mode switching point is not accounted for.

15. The radio network node according to claim 14, wherein the processing circuit further is configured to obtain the information indicating the at least one mode switching point of the radio transmitter based on one or more of:
pre-defined information;
measurements performed by the radio network node;
a procedure for scanning, by the radio network node, transmit power range of the user equipment; and
an indication received from the user equipment.

16. The radio network node according to claim 15, wherein the obtained information relates to a first radio access technology, wherein the user equipment is capable of at least the first radio access technology and a second radio access technology, wherein the processing circuit further is configured to obtain second information relating to the second radio access technology based on the information for the first radio access technology provided that radio transmission characteristics for the first radio access technology is similar to radio transmission characteristics for the second radio access technology, wherein the second information indicates at least one mode switching point of the radio transmitter.

17. The radio network node according to claim 14, wherein the processing circuit further is configured to one or more of:
adapt a Multiple-Input-Multiple-Output (MIMO) configuration of the user equipment based on the information, wherein the MIMO configuration relates to the transmission;
adapt an antenna mode of the user equipment based on the information, which antenna mode relates to the transmission;
adapt a reference signal configuration relating to the transmission based on the information; and
adapt a configuration of a radio receiver comprised in the radio network node based on the information.

18. The radio network node according to claim 14, wherein the processing circuit further is configured to send the information to a further network node, which is capable of using the information for transmission between the user equipment and the further network node.

19. The radio network node according to claim 14, wherein the radio transmitter comprises a first power amplifier and a second power amplifier, wherein the at least one mode switching point indicates when, in terms of transmit power of the radio transmitter, the radio transmitter switches from a first mode, in which the first power amplifier is operated, to a second mode, in which the second power amplifier is operated.

20. A user equipment configured to manage a transmission from the user equipment to a radio network node, comprising:
a processing circuit configured to adapt the transmission based on information, wherein the information indicates at least one mode switching point of a radio transmitter comprised in the user equipment;
wherein the processing circuit is comprised in the user equipment, and
wherein at which said at least one mode switching point a corresponding relative phase discontinuity or phase discontinuity of the radio transmitter changes abruptly, wherein the user equipment is configured to adapt the transmission by adapting a value relating to the transmission based on the information indicating at least one mode switching point, wherein the value comprises a transport format relating to the transmission, wherein the user equipment is configured to adapt the value comprising the transport format by selecting a more robust transport format in view of a less robust transport format selected for the transmission when the information indicating at least one mode switching point is not accounted for.

21. The user equipment according to claim 20, wherein the processing circuit further is configured to adapt a value relating to the transmission based on the information, wherein the value comprises one or more of:

one or more power control parameters relating to the transmission;

a transport format relating to the transmission;

a Multiple-Input-Multiple-Output (MIMO) configuration of the user equipment, wherein the MIMO configuration relates to the transmission;

an antenna mode of the user equipment, which antenna mode relates to the transmission;

a reference signal configuration relating to the transmission; and a configuration of a radio receiver comprised in the radio network node.

22. The user equipment according to claim 20, wherein the processing circuit further is configured to send information relating to the adapted transmission to the radio network node.

23. The user equipment according to claim 20, wherein the processing circuit further is configured to send the information indicating at least one mode switching point to the radio network node.

24. The user equipment according to claim 20, wherein the processing circuit further is configured to adapt the uplink transmission when the information indicates that a relative phase discontinuity of uplink transmission exceeds a threshold value for indicating relative phase discontinuity.

25. The user equipment according to claim 24, wherein the processing circuit further is configured to adapt the uplink transmission provided the user equipment is explicitly configured, by the radio network node, to be allowed to adapt the uplink transmission.

26. The user equipment according to claim 20, wherein the radio transmitter comprises a first power amplifier and a second power amplifier, wherein the at least one mode switching point indicates when, in terms of transmit power of the radio transmitter, the radio transmitter switches from a first mode, in which the first power amplifier is operated, to a second mode, in which the second power amplifier is operated.

\* \* \* \* \*